United States Patent
Tanaka

(10) Patent No.: US 12,063,288 B2
(45) Date of Patent: *Aug. 13, 2024

(54) WIRELESS COMMUNICATION DEVICE AND METHOD

(71) Applicant: SONY GROUP CORPORATION, Tokyo (JP)

(72) Inventor: Yusuke Tanaka, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/339,289

(22) Filed: Jun. 22, 2023

(65) Prior Publication Data

US 2023/0336644 A1 Oct. 19, 2023

Related U.S. Application Data

(63) Continuation of application No. 17/310,106, filed as application No. PCT/JP2020/000582 on Jan. 10, 2020, now Pat. No. 11,722,588.

(30) Foreign Application Priority Data

Jan. 24, 2019 (JP) .................................. 2019-010270

(51) Int. Cl.
 *H04L 69/28* (2022.01)
 *H04L 47/28* (2022.01)
 *H04W 80/08* (2009.01)

(52) U.S. Cl.
 CPC .............. *H04L 69/28* (2013.01); *H04L 47/28* (2013.01); *H04W 80/08* (2013.01)

(58) Field of Classification Search
 CPC ......... H04L 69/00; H04L 69/28; H04L 67/00; H04L 67/01; H04L 69/321; H04L 1/1678;
 (Continued)

(56) References Cited

U.S. PATENT DOCUMENTS 6,469,991 B1 * 10/2002 Chuah ..................... H04L 47/26
 370/347
10,469,375 B2 * 11/2019 Twitchell, Jr. .......... H04L 51/06
 (Continued)

FOREIGN PATENT DOCUMENTS

BR PI0921484 B1 11/2020
CN 101674166 A 3/2010
 (Continued)

OTHER PUBLICATIONS https://en.wikipedia.org/wiki/Traffic_indication_map (Year: NA).
 (Continued)

*Primary Examiner* — Warner Wong
(74) *Attorney, Agent, or Firm* — CHIP LAW GROUP

(57) ABSTRACT

The present technology relates to a wireless communication device and a method that make it possible to transmit, with low delay, the data supplied from an upper layer. The wireless communication device transmits a signal including first data that is supplied from an upper layer and information regarding timing of transmission of second data that is generated in another wireless communication device on the basis of a result of receiving the first data and is transmitted therefrom. The present technology can be applied to a wireless communication device.

15 Claims, 18 Drawing Sheets

(58) Field of Classification Search
CPC ......... H04L 5/0078; H04L 2012/5674; H04L 2025/03745; H04L 47/28; H04W 80/08; H04W 80/00; H04W 56/00
See application file for complete search history.

(56) References Cited

U.S. PATENT DOCUMENTS

| | | | |
|---|---|---|---|
| 2004/0160919 A1* | 8/2004 | Balachandran | H04L 1/1671 370/335 |
| 2004/0179523 A1* | 9/2004 | Maruyama | H04L 9/40 370/389 |
| 2006/0133365 A1* | 6/2006 | Manjunatha | H04L 69/28 370/389 |
| 2015/0334729 A1* | 11/2015 | Ji | H04W 72/566 370/336 |
| 2016/0374100 A1 | 12/2016 | Das et al. | |
| 2017/0245306 A1 | 8/2017 | Kim et al. | |
| 2018/0324623 A1 | 11/2018 | Jung | |
| 2018/0343096 A1 | 11/2018 | Kim | |
| 2019/0296886 A1 | 9/2019 | Sekiya et al. | |
| 2021/0250133 A1 | 8/2021 | Chun et al. | |
| 2022/0078775 A1 | 3/2022 | Kiriyama et al. | |

FOREIGN PATENT DOCUMENTS

| | | | |
|---|---|---|---|
| CN | 101765151 A | 6/2010 | |
| CN | 106576102 A | 4/2017 | |
| CN | 107534686 A | 1/2018 | |
| CN | 107925514 A | 4/2018 | |
| CN | 109196809 A | 1/2019 | |
| JP | 2007-288656 A | 11/2007 | |
| JP | 2009-060660 A | 3/2009 | |
| JP | 2017-163174 A | 9/2017 | |
| TW | 201818780 A | 5/2018 | |
| TW | 1644585 B | 12/2018 | |
| WO | 2016/013291 A1 | 1/2016 | |
| WO | WO-2017195748 A1 * | 11/2017 | ............ H04W 28/06 |
| WO | WO-2018138905 A1 | 8/2018 | |

OTHER PUBLICATIONS

International Search Report and Written Opinion of PCT Application No. PCT/JP2020/000582, issued on Mar. 3, 2020, 09 pages of translation and 07 pages of ISRWO.
International Preliminary Report on Patentability of PCT Application No. PCT/JP2020/000582, issued on Jul. 27, 2021, 08 pages of English Translation and 06 pages of IPRP.
Notice of Allowance for U.S. Appl. No. 17/310,106, issued on Apr. 6, 2023, 2 pages.
Notice of Allowance for U.S. Appl. No. 17/310,106, issued on Mar. 16, 2023, 9 pages.
Non-Final Office Action for U.S. Appl. No. 17/310,106, issued on Dec. 8, 2022, 10 pages.

* cited by examiner

FIG. 11

| Signal Type | Length | Data Type | Priority | Estimated Transmission Start Time | Estimated Transmission Duration |

FIG. 16

| Signal Type | Length | Target ID | Destination ID | Frequency Resource | Spatial Stream Resource | NOMA Resource | Carrier Sense Required | Timing |

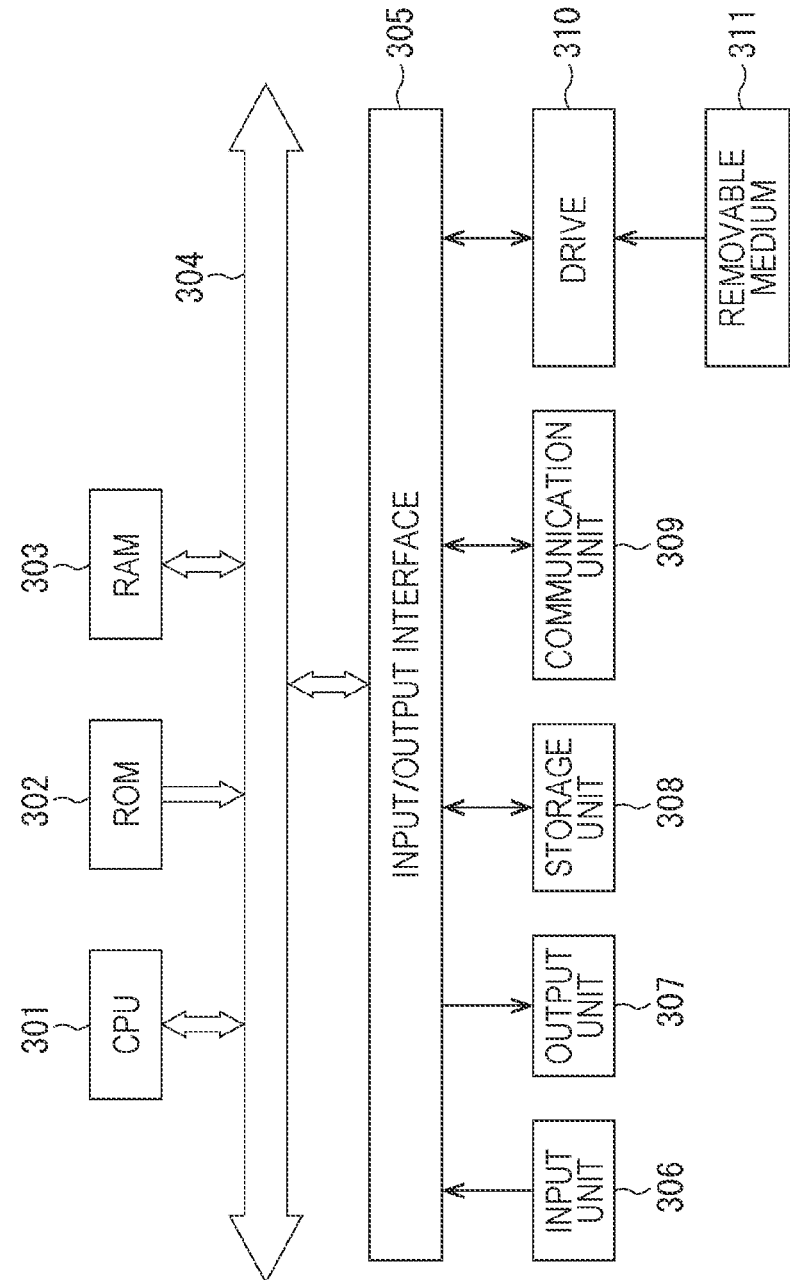

WIRELESS COMMUNICATION DEVICE AND METHOD

CROSS REFERENCE TO RELATED APPLICATIONS

The present application is a continuation of U.S. patent application Ser. No. 17/310,106, filed Jul. 16, 2021, which is a U.S. National Phase of International Patent Application No. PCT/JP2020/000582, filed on Jan. 10, 2020, which claims priority benefit of Japanese Patent Application No. JP 2019-010270, filed in the Japan Patent Office on Jan. 24, 2019. Each of the above-referenced is hereby incorporated herein by reference in its entirety.

TECHNICAL FIELD

The present technology relates to a wireless communication device and a method, and more particularly, to a wireless communication device and a method that make it possible to transmit, with low delay, the data supplied from an upper layer.

BACKGROUND ART

There has been an increase in the number of use cases involving data that is to be transmitted with low delay, such as factory automations and on-line games widespread on mobile terminals. In wireless communications performing communication based on carrier sense in an unlicensed frequency band, there is also a desire for a mechanism for transmitting data with low delay to cope with such use cases.

In wireless communications, there may be cases where it is known in a specific layer of the OSI reference model that certain data should be transmitted with low delay. On the other hand, in the layers lower than that layer, the data transferred from an upper layer is handled indiscriminately (see Patent Document 1).

For example, in the MAC layer in IEEE 802.11, data transferred from an upper layer is handled uniformly without regard to discriminated handling in the upper layer.

It is conceivable that the data to be transmitted with low delay in an upper layer includes data that is generated on the basis of a result of receiving certain data.

The data to be transmitted with low delay in an upper layer is, for example, data including information regarding the next moving image frame in an on-line game or VR, the data being generated on the basis of user operation information sent from a mobile terminal to a server and being transmitted from the server to the mobile terminal so as to be in time for generation or selection of the next moving image frame.

In addition, the data to be transmitted with low delay in an upper layer is, for example, data including a sensing result in mechanical remote control of a device, the data being generated on the basis of device control information transmitted from a server to a mobile terminal associated with the device and being transmitted from the mobile terminal to the server so as to be in time for generation of the next control information.

CITATION LIST

Patent Document

Patent Document 1: Japanese Patent Application Laid-Open No. 2009-60660

SUMMARY OF THE INVENTION

Problems to be Solved by the Invention

Such data that should be transmitted with low delay in an upper layer will be transmitted from the MAC layer as general data after a transmission opportunity is acquired on the basis of random access, and conventionally the delay may be increased depending on the conditions of interference caused by surroundings.

Furthermore, in general, the signal processing time in an upper layer is longer than the signal processing time in the MAC layer, and conventionally it is difficult to transmit the signal in a short inter-frame space (SIFS) in the MAC layer without the need for acquiring a transmission opportunity.

The present technology has been made in view of such circumstances, and is intended to enable the data supplied from an upper layer to be transmitted with low delay.

Solutions to Problems

A wireless communication device according to one aspect of the present technology includes a transmission control unit that causes a signal to be transmitted, the signal including first data that is supplied from an upper layer and information regarding timing of transmission of second data that is generated in another wireless communication device on the basis of a result of receiving the first data and is transmitted therefrom.

In one aspect of the present technology, a signal is transmitted, the signal including first data supplied from an upper layer and information regarding the timing of transmission of second data that is generated in another wireless communication device on the basis of a result of receiving the first data and is transmitted therefrom.

A wireless communication device according to another aspect of the present technology includes a reception unit that receives a first signal including first data that is supplied from an upper layer and information regarding timing of transmission of second data that is generated in the wireless communication device on the basis of a result of receiving the first data and is transmitted from the wireless communication device.

In another aspect of the present technology, a first signal is received, the first signal including first data supplied from an upper layer and information regarding the timing of transmission of second data that is generated in a wireless communication device on the basis of a result of receiving the first data and is transmitted from the wireless communication device.

BRIEF DESCRIPTION OF DRAWINGS

FIG. 11 is a diagram illustrating an example format of a signal including information regarding the timing of transmission of second data.

FIG. 16 is a diagram illustrating an example format of a control signal controlling the timing of transmission of a signal that includes first data and information regarding the timing of transmission of second data.

FIG. 18 is a block diagram illustrating an example configuration of a computer.

MODE FOR CARRYING OUT THE INVENTION

A mode for carrying out the present technology will now be described. Descriptions are provided in the order mentioned below.

1. First embodiment (example of unconstrained topology)
2. Second embodiment (first example of constrained topology)
3. Third embodiment (second example of constrained topology)
4. Fourth embodiment (computer)

1. First Embodiment (Example of Unconstrained Topology)

<Example of OSI Reference Model>

Figure 1:
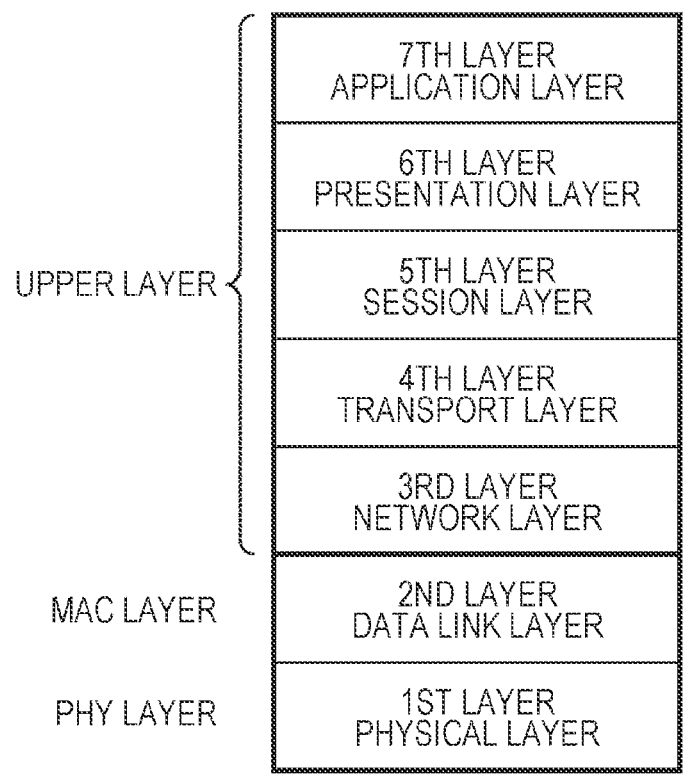
FIG. 1 is a diagram showing an OSI reference model.

FIG. 1 is a diagram showing an OSI reference model.

The OSI reference model is made up of, in the order from lower to upper layers, the first, physical layer; the second, data link layer; the third, network layer; the fourth, transport layer; the fifth, session layer; the sixth, presentation layer; and the seventh, application layer.

The main regions described herein are the first, physical layer and the second, data link layer. The first, physical layer and the second, data link layer are hereinafter referred to as the PHY layer and the MAC layer, respectively, and the third to seventh layers and a portion higher than these layers are hereinafter collectively referred to as the upper layer.

<Example in Accordance with IEEE 802.11>

Figure 2:
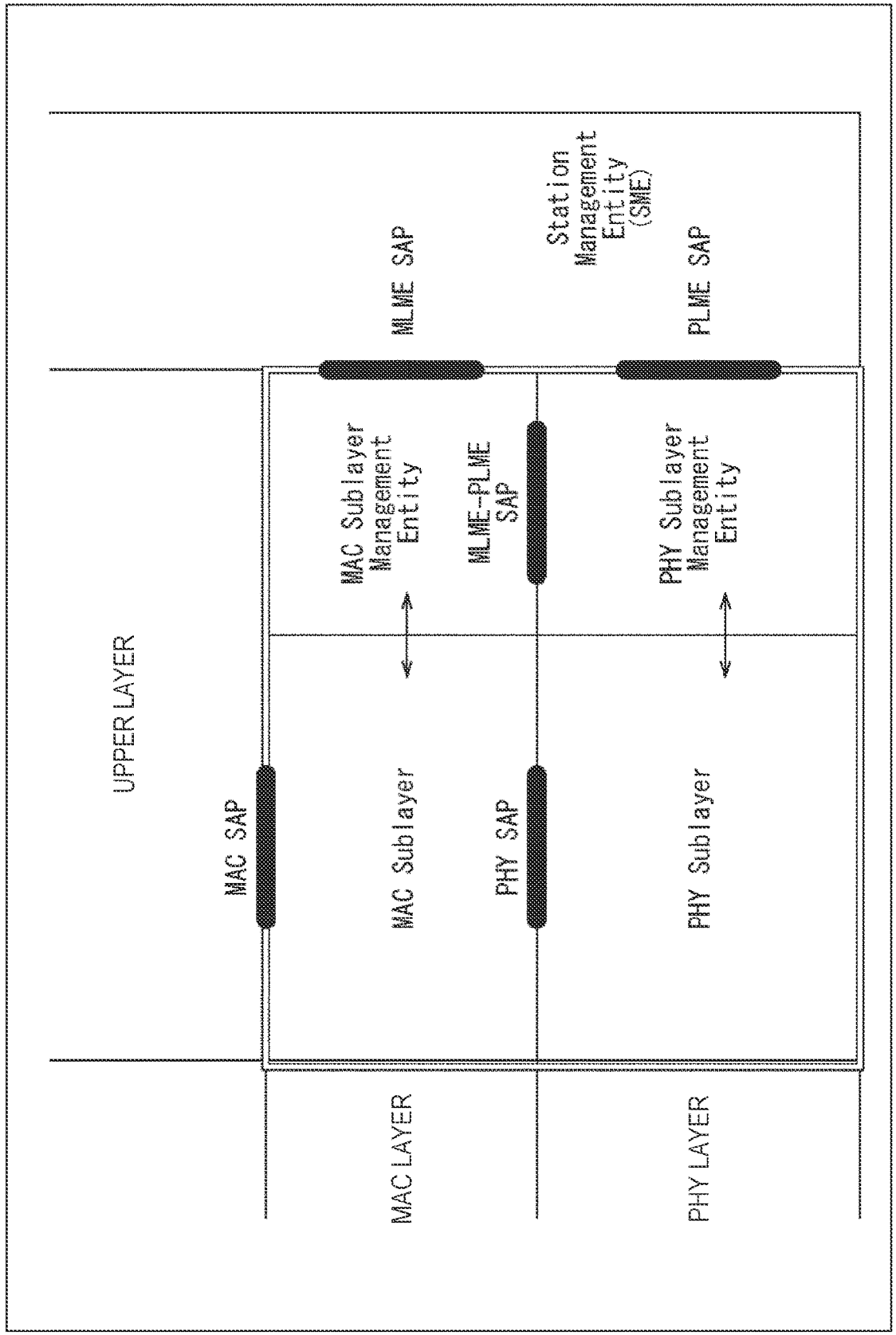
FIG. 2 is a diagram illustrating an example of a layer structure and interfaces in accordance with IEEE 802.11.

FIG. 2 is a diagram illustrating an example of a layer structure and interfaces in accordance with IEEE 802.11.

The PHY layer, the MAC layer, and the upper layer are shown in the order from bottom to top.

The PHY layer is configured such that PHY Sublayer and PHY Sublayer Management Entity can access each other. The MAC layer is configured such that MAC Sublayer and MAC Sublayer Management Entity can access each other.

PHY-SAP, which is located between PHY Sublayer and MAC Sublayer, is an interface connecting PHY Sublayer and MAC Sublayer. MLME-PLME SAP, which is located between PHY Sublayer Management Entity and MAC Sublayer Management Entity, is an interface connecting PHY Sublayer Management Entity and MAC Sublayer Management Entity.

MAC SAP, which is located between the upper layer and MAC Sublayer, is an interface connecting the upper layer and MAC Sublayer.

Furthermore, to the right of the PHY layer, the MAC layer, and the upper layer, there is located Station Management Entity (SME), which is a control entity controlling the individual layers.

PLME SAP, which is located between PHY Sublayer Management Entity and SME, is an interface connecting PHY Sublayer Management Entity and SME.

MLME SAP, which is located between MAC Sublayer Management Entity and SME, is an interface connecting MAC Sublayer Management Entity and SME.

<Data in Each Layer>

Figure 3:
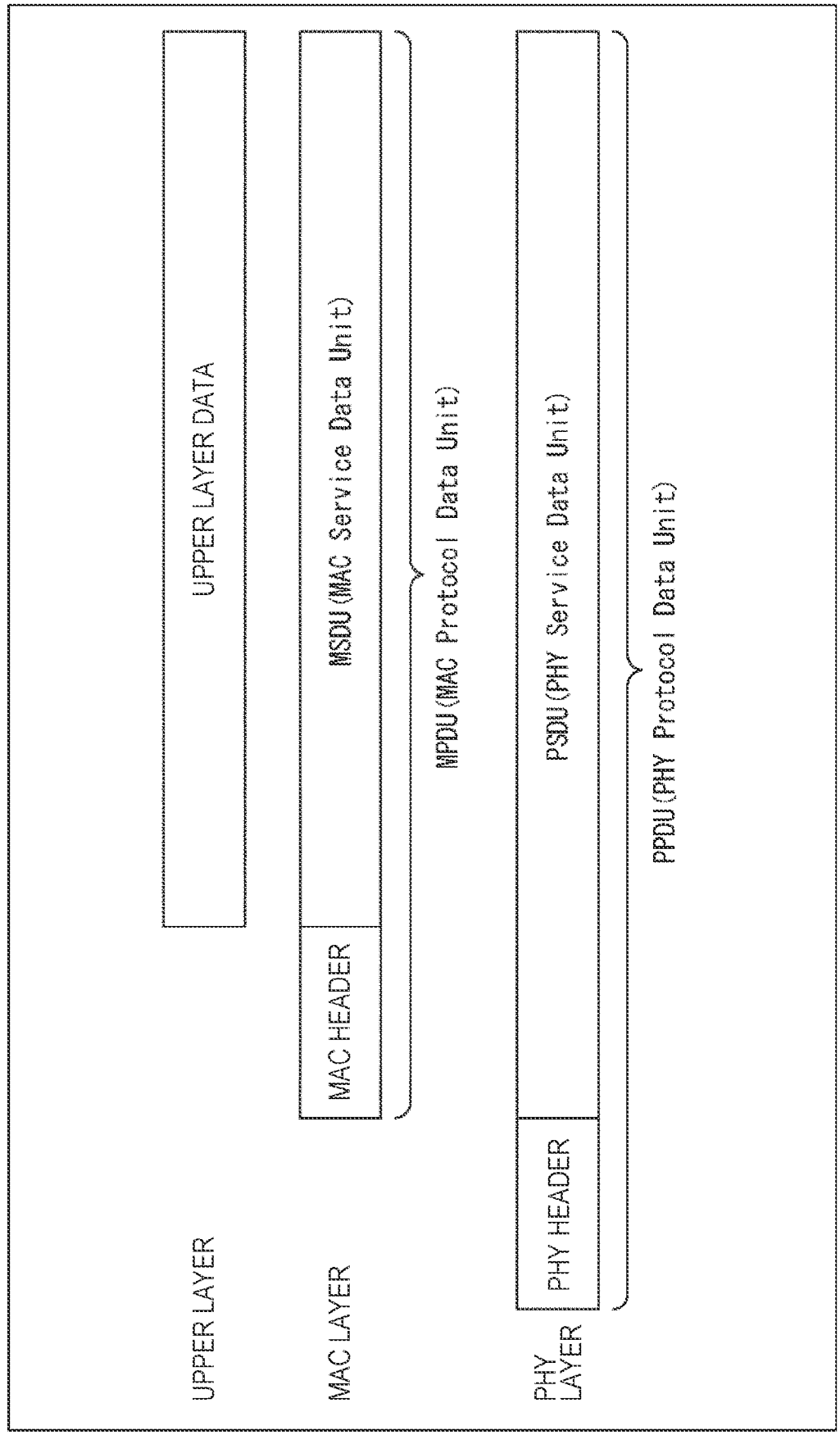
FIG. 3 is a diagram illustrating an example of data and a header thereof in each of the layers.

FIG. 3 is a diagram illustrating an example of data and a header thereof in each of the layers.

In the upper layer, upper layer data is generated and supplied to the MAC layer. The upper layer data is first data and second data in the present technology. The upper layer data corresponds to a MAC service data unit (MSDU) in the MAC layer.

In the MAC layer, a MAC header is added to the MSDU to generate a MAC protocol data unit (MPDU), and the MPDU is supplied to the PHY layer.

The MPDU corresponds to a PHY service data unit (PSDU) in the PHY layer.

In the PHY layer, a PHY header is added to the PSDU to generate a PHY protocol data unit (PPDU), and the PPDU is transmitted to another wireless communication device. That is, the PPDU represents a signal (a first signal or a second signal) in the present technology.

<Example Configuration of PSDU>

Figure 4:
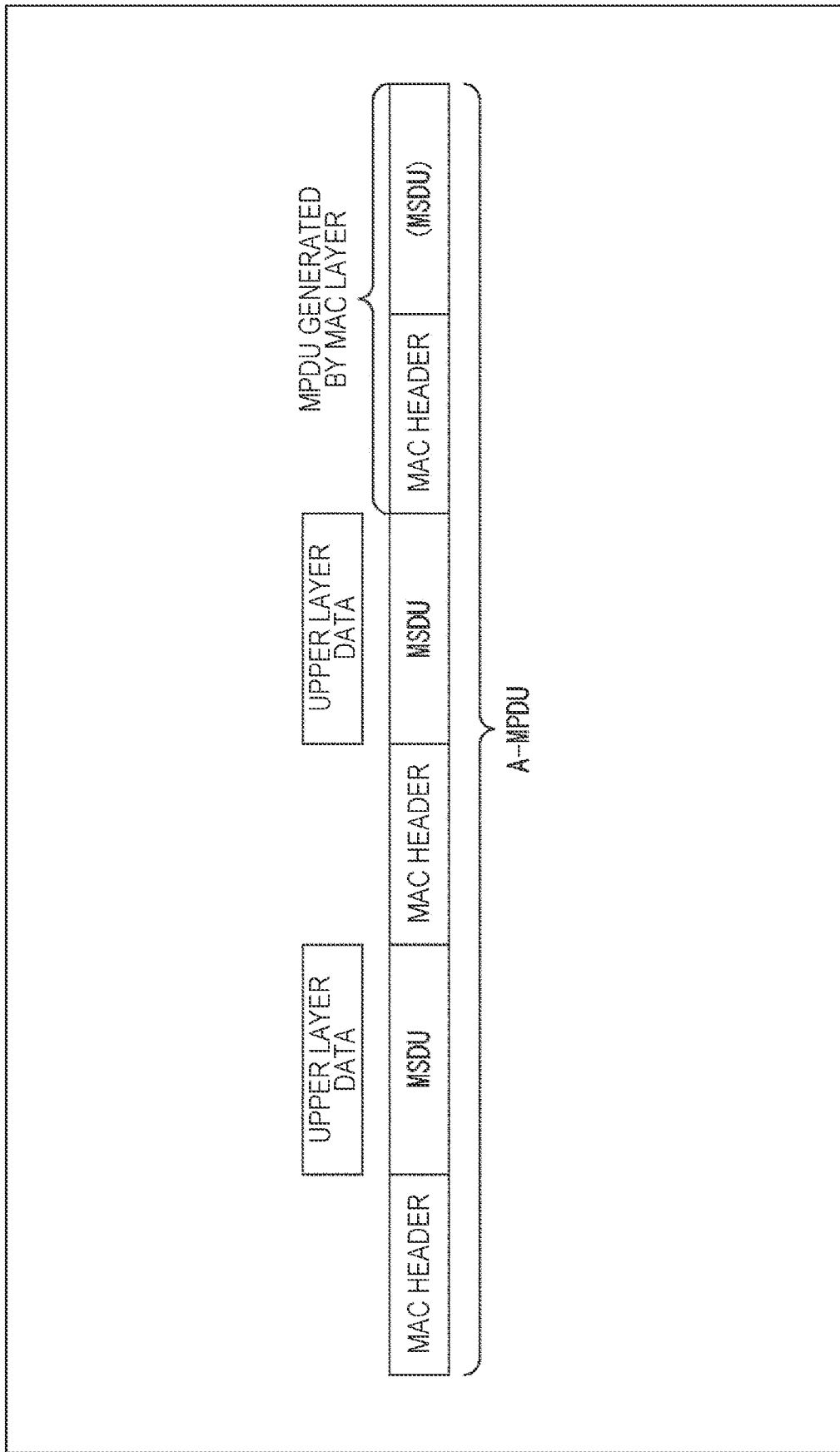
FIG. 4 is a diagram illustrating another example configuration of a PSDU.

FIG. 4 is a diagram illustrating another example configuration of a PSDU.

As illustrated in FIG. 3, a PSDU is equivalent to an MPDU; however, a PSDU may be an A-MPDU including a plurality of MPDUs as shown in FIG. 4.

For example, a PSDU includes an A-MPDU in which two MSDUs containing upper layer data are linked to an MPDU generated in the MAC layer.

<Example Configuration of Wireless Communication System>

Figure 5:
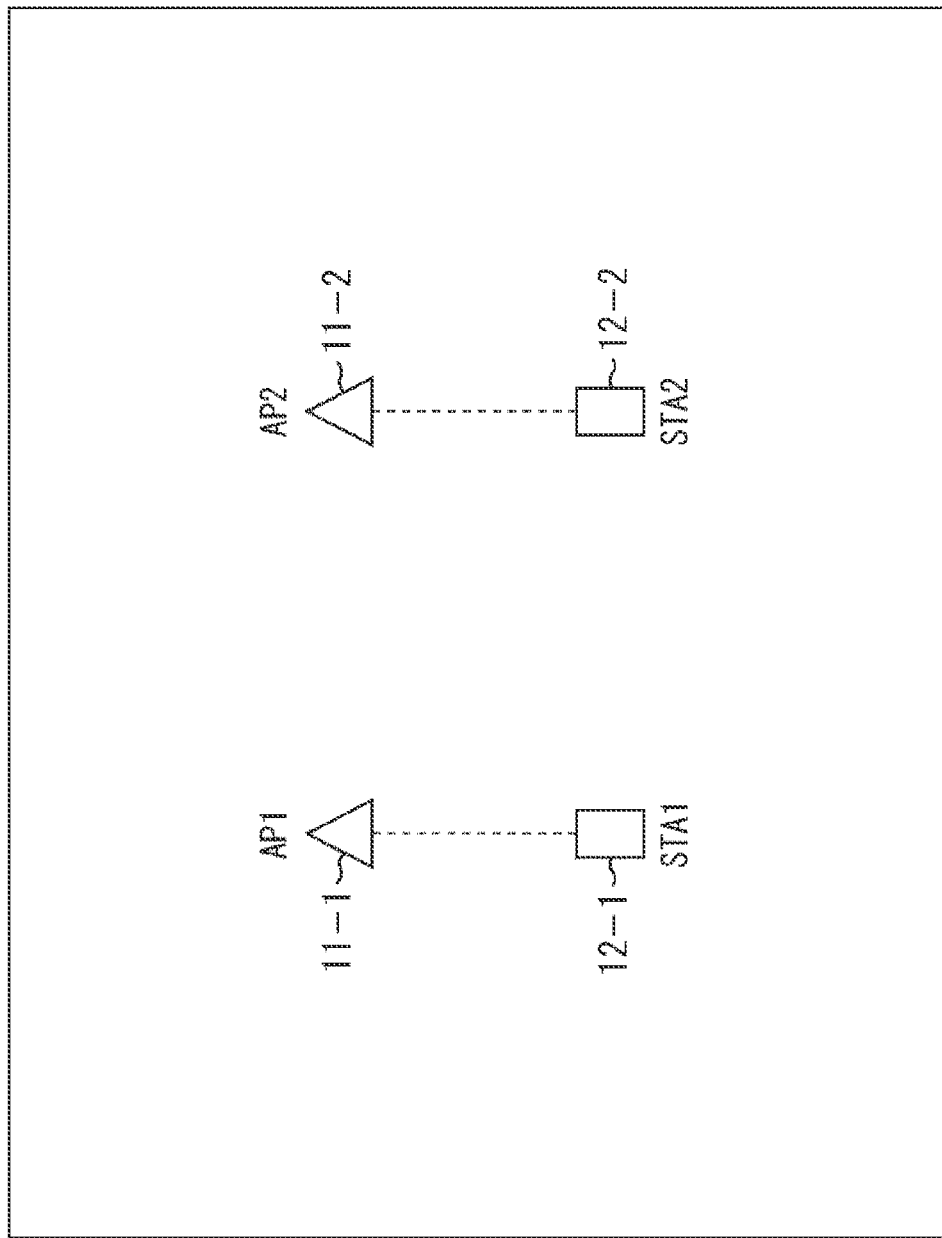
FIG. 5 is a diagram illustrating an example configuration of a wireless communication system according to a first embodiment of the present technology.

FIG. 5 is a diagram illustrating an example configuration of a wireless communication system according to a first embodiment of the present technology.

The wireless communication system in FIG. 5 has a configuration in which a base station AP1 is connected to a terminal STA1 by wireless communication and a base station AP2 is connected to a terminal STA2 by wireless communication. The wireless communication system in FIG. 5 is a wireless communication system in an unconstrained topology in which individual APs are operating in an autonomous distributed manner and in cooperation with one another.

The base station AP1 includes a wireless communication device 11-1. The base station AP2 includes a wireless communication device 11-2. The terminal STA1 includes a wireless communication device 12-1. The terminal STA2 includes a wireless communication device 12-2. The base stations AP1 and AP2 are hereinafter simply referred to as AP1 and AP2, and the terminals STA1 and STA2 are hereinafter simply referred to as STA1 and STA2.

The wireless communication devices 11-1 and 11-2 are referred to as the wireless communication device 11 unless these wireless communication devices need to be distinguished. The wireless communication devices 12-1 and 12-2 are referred to as the wireless communication device 12 unless these wireless communication devices need to be distinguished. Note that the wireless communication devices 11 and 12 will be described later.

AP1 transmits a signal (first signal) that includes first data supplied from the upper layer and the information regarding the timing of transmission of second data generated by STA1 on the basis of a result of receiving the first data. The information regarding the timing of transmission of the second data is also based on the timing at which the second data is generated in the upper layer in STA1.

AP1 receives a signal including the second data transmitted by STA1, and transmits a response signal to the second data included in the received signal.

STA1 receives the signal including the first data and the information regarding the timing of transmission of second data, and transmits a response signal to the first data included in the received signal. STA1 performs signal processing in its upper layer to generate the second data.

STA1 transmits a signal (second signal) including the generated second data on the basis of the information regarding the timing of transmission of second data.

AP2 receives, from the signal transmitted by AP1, a signal including the first data and the information regarding the timing of transmission of the second data, and performs transmission suppression on the basis of the information regarding the timing of transmission of second data.

As described above, in the wireless communication system in FIG. 5, a signal (first signal) that includes the first data supplied from the upper layer and the information regarding the timing of transmission of second data is transmitted. Then, on the basis of the information regarding the timing of transmission of second data, a signal (second signal) including the second data is transmitted while other transmission except the second data is suppressed.

As a result, the data supplied from the upper layer can be transmitted with low delay.

<Example Configuration of Wireless Communication Device>

Figure 6:
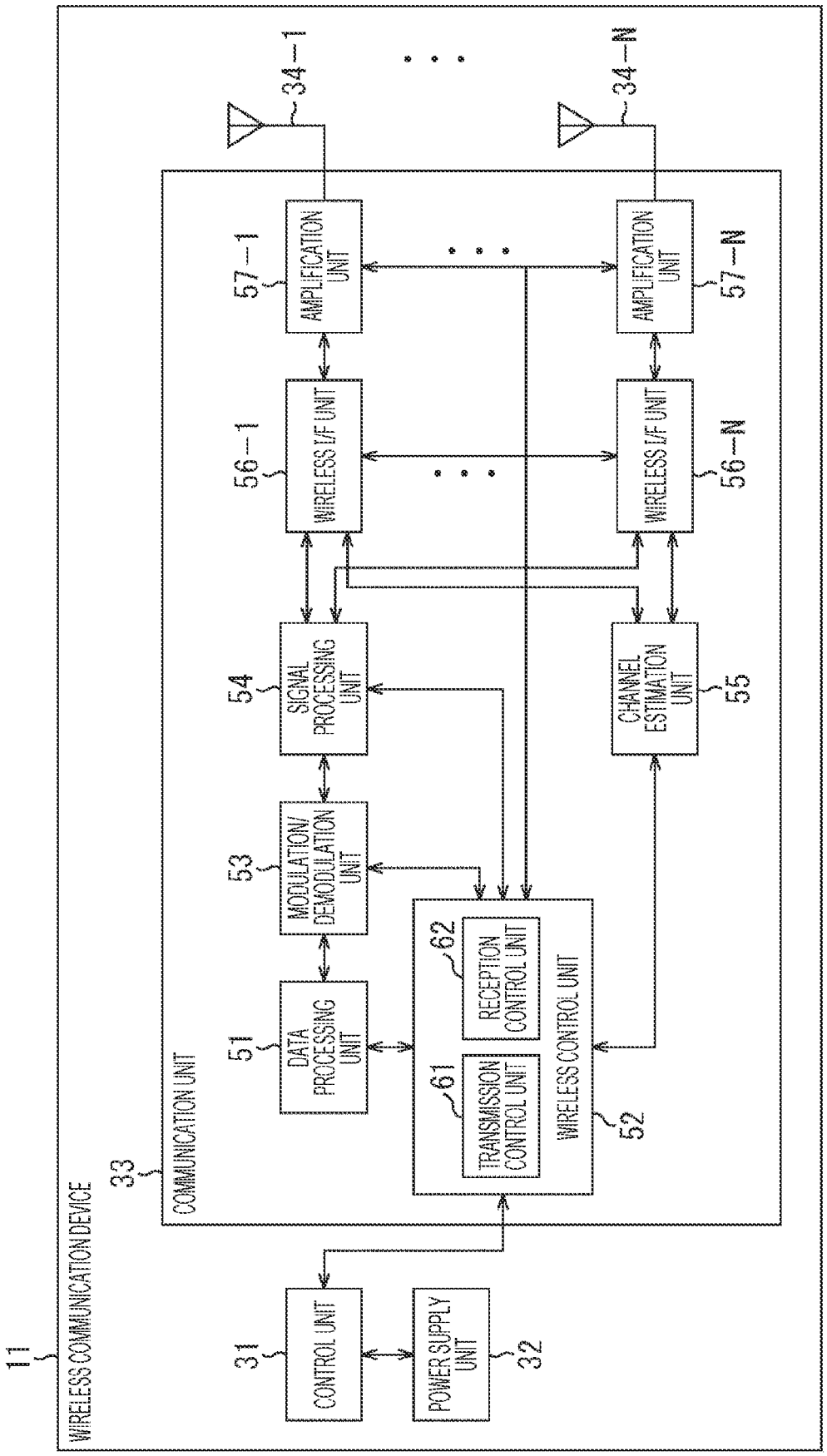
FIG. 6 is a block diagram illustrating an example configuration of a wireless communication device.

FIG. 6 is a block diagram illustrating an example configuration of the wireless communication device 11.

Note that the wireless communication device 12 basically has a configuration similar to the configuration of the wireless communication device 11, and thus the wireless communication device 12 is described below by using the configuration of the wireless communication device 11 as appropriate.

The wireless communication device 11 includes a control unit 31, a power supply unit 32, a communication unit 33, and antennas 34-1 to 34-N.

The communication unit 33 transmits and receives data. The communication unit 33 includes a data processing unit 51, a wireless control unit 52, a modulation/demodulation unit 53, a signal processing unit 54, a channel estimation unit 55, wireless interface (I/F) units 56-1 to 56-N, and amplification units 57-1 to 57-N.

The wireless I/F units 56-1 to 56-N, the amplification units 57-1 to 57-N, and the antennas 34-1 to 34-N may be grouped into sets, where each of the sets has the same suffix numbers, and one or more sets may constitute a component. Note that the functions of the amplification units 57-1 to 57-N may be included in the wireless I/F units 56-1 to 56-N.

Note that the wireless I/F units 56-1 to 56-N, the amplification units 57-1 to 57-N, and the antennas 34-1 to 34-N are hereinafter referred to as the wireless I/F unit 56, the amplification unit 57, and the antenna 34 as appropriate unless these units need to be distinguished.

The control unit 31 controls the power supply unit 32 and the wireless control unit 52. In place of the wireless control unit 52, the control unit 31 may perform at least part of the operation of the wireless control unit 52.

The power supply unit 32 includes a battery power source or a fixed power source, and supplies power to the entire wireless communication device 11.

At a time during transmission, the data processing unit 51 generates a packet for wireless transmission by using the data supplied from the upper layer. The data processing unit 51 performs processing, such as addition of a header for media access control (MAC), addition of an error detection code, and the like, on the generated packet, and outputs the processed data to the modulation/demodulation unit 53.

At a time during reception, the data processing unit 51 analyzes the MAC header, detects any packet error, performs reordering, and the like on the data supplied from the modulation/demodulation unit 53, and outputs the processed data to an upper layer relative to the data processing unit 51.

The wireless control unit 52 transfers information among the individual units in the wireless communication device 11 and controls these units. The wireless control unit 52 includes a transmission control unit 61 and a reception control unit 62.

At a time during transmission, the transmission control unit 61 makes parameter settings for the modulation/demodulation unit 53 and the signal processing unit 54, performs packet scheduling for the data processing unit 51, makes parameter settings and controls transmission power for the wireless I/F unit 56 and the amplification unit 57, as necessary. At a time during reception, the reception control unit 62 makes parameter settings for the modulation/demodulation unit 53 and the signal processing unit 54 and makes parameter settings for the wireless I/F unit 56 and the amplification unit 57, as necessary.

At a time during transmission, the modulation/demodulation unit 53 performs coding, interleaving, and modulation on the data supplied from the data processing unit 51 on the basis of the coding method and the modulation method set by the control unit 31, generates a data symbol stream, and outputs the generated data symbol stream to the signal processing unit 54.

At a time during reception, the modulation/demodulation unit 53 outputs, to the data processing unit 51 or the wireless control unit 52, the data resulting from demodulation, deinterleaving, and decoding on the data symbol stream supplied from the signal processing unit 54.

At a time during transmission, the signal processing unit 54 performs signal processing for spatial separation on the data symbol stream supplied from the modulation/demodulation unit 53, and outputs one or more transmission symbol streams resulting from the signal processing to each wireless I/F unit 56, as necessary.

At a time during reception, the signal processing unit 54 performs signal processing on the reception symbol stream supplied from each wireless I/F unit 56, performs spatial separation on the stream as necessary, and outputs the data symbol stream resulting from the spatial separation to the modulation/demodulation unit 53.

The channel estimation unit 55 calculates complex channel gain information regarding the propagation path from the preamble part and the training signal part in the reception symbol stream supplied from each wireless I/F unit 56. The calculated complex channel gain information is supplied to the modulation/demodulation unit 53 and the signal processing unit 54 via the wireless control unit 52, and used for the demodulation processing in the modulation/demodulation unit 53 and for the spatial separation processing in the signal processing unit 54.

At a time during transmission, the wireless I/F unit 56 converts the transmission symbol stream supplied from the signal processing unit 54 into an analog signal, performs filtering, up-conversion to a carrier frequency, and phase control on the analog signal, and outputs the analog signal obtained after the phase control to the amplification unit 57.

At a time during reception, the wireless I/F unit 56 performs phase control, down-conversion, and inverse filtering on the analog signal supplied from the amplification unit 57, and outputs a reception symbol stream resulting from converting the analog signal into a digital signal to the signal processing unit 54 and the channel estimation unit 55.

At a time during transmission, the amplification unit 57 amplifies the analog signal supplied from the wireless I/F unit 56 to a predetermined power level, and outputs the analog signal with amplified power to the antenna 34. At a time during reception, the amplification unit 57 amplifies the analog signal supplied from the antenna 34 to a predetermined power level, and outputs the analog signal with amplified power to the wireless I/F unit 56.

At least part of at least one of a function of the amplification unit 57 fulfilled during transmission or a function of the amplification unit 57 fulfilled during reception may be included in the wireless I/F unit 56. At least part of at least one of the amplification units 57 may constitute a component outside the communication unit 33.

<Sequence of Operations of Wireless Communication System>

Figure 7:
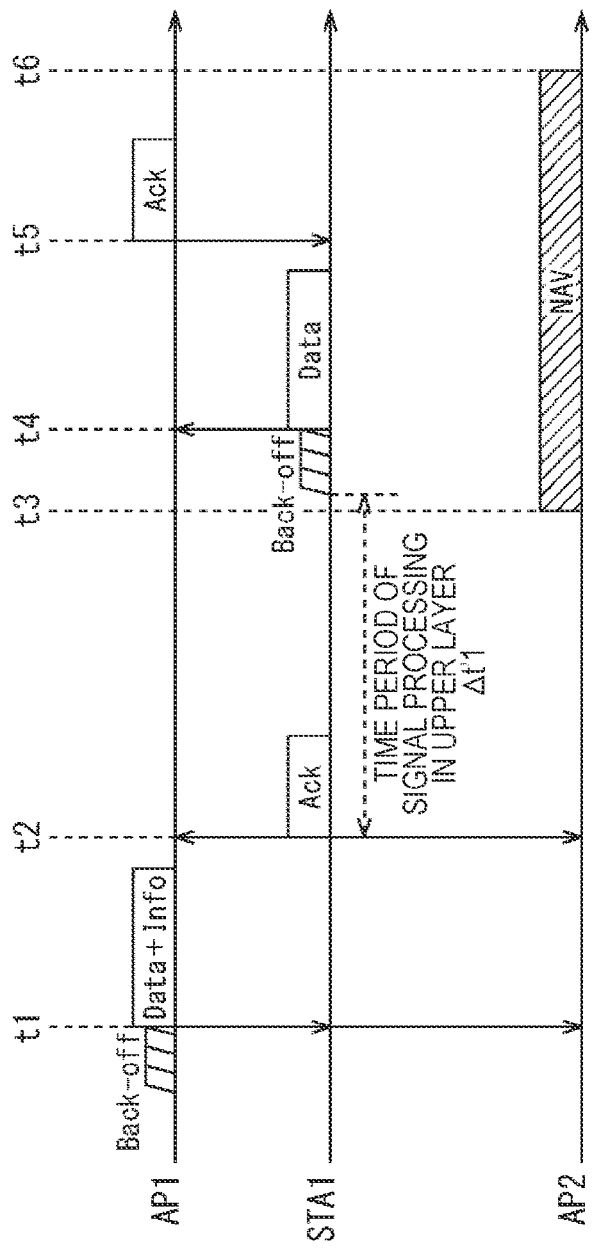
FIG. 7 is a diagram illustrating a sequence of operations of the wireless communication system of the first embodiment.

FIG. 7 is a diagram illustrating a sequence of operations of the wireless communication system of the first embodiment.

FIG. 7 illustrates an operation example in which first data and information regarding the timing of transmission of second data that is to be transmitted with low delay are generated in the upper layer in AP1, and then transmitted by the MAC layer and the PHY layer to STA1.

Note that the description below assumes that AP1 is an access point and STA1 is a terminal; however, operations described in the present embodiment are still valid when the access point and the terminal are replaced with each other. In addition, the description assumes that AP2 is an access point; however, operations described in the present embodiment are still valid when AP2 is replaced with a terminal.

When first data is generated in the upper layer in AP1 and the generated first data is transferred to the MAC layer, AP1 performs, for example, back-off to start acquiring a transmission opportunity. Back-off is a collision avoidance mechanism based on the back-off process in the IEEE 802.11 standard. Note that acquisition of a transmission opportunity is not necessarily based on a collision avoidance mechanism but may be done on the basis of another method.

The first data is data involving an expectation that second data will be generated and transmitted in an upper layer in a wireless communication device that has received the first data, on the basis of a result of receiving the first data.

For example, the first data is data generated on the basis of user operation information that is transmitted to a server from a mobile terminal on which an on-line game is being played. In this case, the second data is data including the information regarding the next moving image frame, the information being transmitted from the server to the mobile terminal so as to be in time for generation or selection of the next moving image frame in the mobile terminal.

In addition, in a case where mechanical operations of a device are remote-controlled, the first data is, for example, data generated on the basis of the device control information transmitted from a saver to a mobile terminal associated with the device. In this case, the second data is data including the sensing result, which is transmitted from the mobile terminal to the server so as to be in time for generation of the next control information.

When transferring the first data to the MAC layer, the upper layer in AP1 transfers, together with the first data, the information regarding the timing of transmission of second data. The transfer is done via an interface between the upper layer and the MAC layer. The interface may be an interface connecting the upper layer and the MAC layer. The interface may also be an interface connecting an entity controlling the upper layer and an entity controlling the MAC layer. For example, the interface may be Station Management Entity (SME) and Mac Layer Management Entity (MLME), which are defined in IEEE 802.11 and shown in FIG. 2.

Having acquired a transmission opportunity, at time t1, AP1 transmits a signal including the first data and the information regarding the timing of transmission of second data (Data+Info).

Note that the signal may be transmitted as a unicast addressed to STA1, or transmitted to a plurality of wireless communication devices including STA1, or transmitted as a broadcast.

The information regarding the timing of transmission of second data may be written in the PHY header or the MAC header, which are shown in FIG. 3, of the signal containing the first data. Alternatively, the information regarding the timing of transmission of second data may be written in the MPDU generated by the MAC layer, as shown in FIG. 4. The information regarding the timing of transmission of second data is contained in at least one of the MAC header, the PHY header, or the MPDU generated by the MAC layer.

Furthermore, the information regarding the timing of transmission of second data may be, as a signal that includes the information regarding the timing of transmission of second data, linked to and sent with the signal that includes the first data.

Having received from AP1 the signal including the first data and the information regarding the timing of transmission of second data, STA1 transmits, at time t2, a response signal (ACK) to the first data included in the received signal.

Together with the response signal, STA1 may transmit information regarding the timing of transmission of second data. In this case, the information regarding the timing of transmission of second data may be the same as the information received from AP1 regarding the timing of transmission of second data, or may be information that has been changed as a result of calculation.

Alternatively, for example, the information regarding the timing of transmission of second data may be information obtained by subtracting a time differential between the timing of reception of the signal that includes the first data and the information regarding the timing of transmission of second data and the timing of transmission of the response signal.

In a case where the information regarding the timing of transmission of second data is transmitted together with the response signal, the response signal may be transmitted as a unicast addressed to STA1, or transmitted to a plurality of wireless communication devices including STA1, or transmitted as a broadcast.

In this case, the information regarding the timing of transmission of second data may also be written in the PHY header or the MAC header, which are shown in FIG. 3, or in the MPDU generated by the MAC layer, which is shown in FIG. 4, of the signal containing the first data. Furthermore, the information regarding the timing of transmission of second data may be, as a signal that includes the information regarding the timing of transmission of second data, linked to and sent with the signal that includes the first data.

Having received from AP1 or STA1 the information regarding the timing of transmission of second data, AP2 determines a duration of transmission suppression (NAV), and starts the transmission suppression at the beginning of the determined duration.

AP2 determines that, for example, the time period from time t3 to time t6 is the duration of the transmission suppression (NAV). The duration of the transmission suppression (NAV) is determined so as to include at least time t4, which is the timing of transmission in STA1 of the second data, and the timing of reception in STA1 of a response signal transmitted from AP1 at time t5 in response to the second data.

After receiving the first data, at time t2, STA1 transmits a response signal to the first data included in the received signal and performs signal processing in the upper layer.

If STA1 holds the second data at the timing of transmission of the second data, STA1 performs, for example, back-off after the time period Δt'1 of signal processing in the upper layer to start acquiring a transmission opportunity. When a transmission opportunity has been acquired, STA1 transmits a signal including the second data at, for example, time t4.

If STA1 does not hold the second data at the timing of transmission of the second data, STA1 may transmit a signal indicating that STA1 does not hold the second data. The signal indicating that STA1 does not hold the second data may be transmitted together with a QoS Null frame. The signal indicating that STA1 does not hold the second data may include information regarding a new timing.

In addition, at the timing of transmission of second data, AP1 may transmit an inducing signal (a polling frame or a trigger frame) that induces a signal including the second data. In this case, having received the inducing signal transmitted from AP1, STA1 transmits a signal including the second data in response to the inducing signal.

Having received the signal including the second data transmitted by STA1, AP1 transmits, at time t5, a response signal to the second data included in the received signal. STA1 receives the response signal to the second data, the response signal being transmitted from AP1.

Note that the wireless communication devices in AP1 and AP2 are access points, and thus other wireless communication devices thereunder may be controlled so that these other wireless communication devices perform transmission suppression. Furthermore, prior to the sequence in FIG. 7, AP1 and STA1 may mutually confirm whether or not they support the above-described operations. In addition, AP1 and STA1 may exchange information indicating the processing capacity in their upper layers.

<Operations of Wireless Communication Device>

Figure 8:
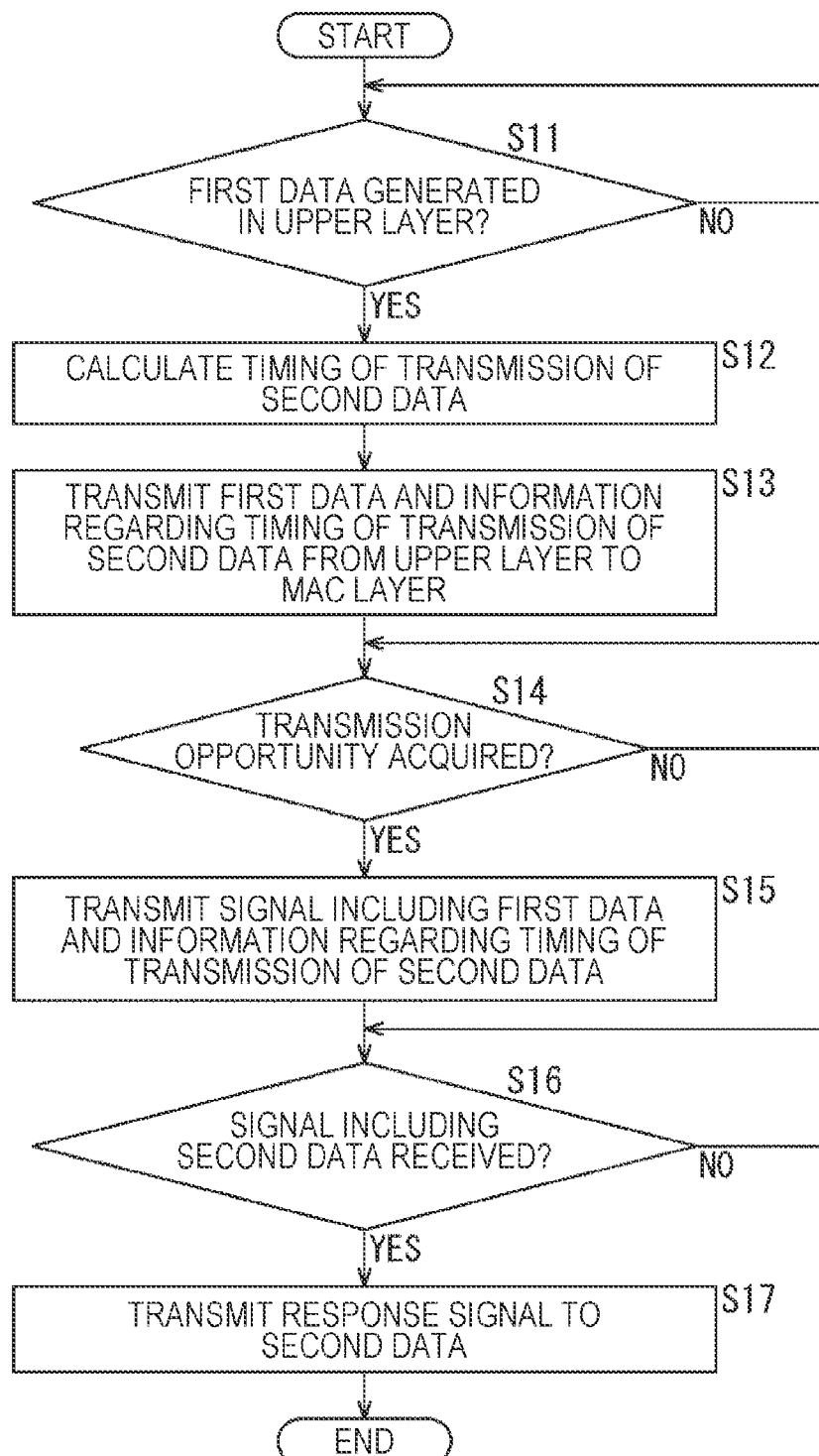
FIG. 8 is a flowchart explaining a wireless communication process carried out by the wireless communication device in AP1.

FIG. 8 is a flowchart explaining a wireless communication process carried out by the wireless communication device 11-1 in AP1.

In step S11, the data processing unit 51 in AP1 is on standby until it is determined that first data has been generated in the upper layer. In step S11, when it is determined that first data has been generated in the upper layer, the processing goes to step S12.

In step S12, the timing of transmission of second data is calculated in the upper layer.

In step S13, the interface connecting the upper layer and the MAC layer transfers, from the upper layer to the MAC layer, the first data and the information regarding the timing of transmission of second data.

In step S14, the transmission control unit 61 is on standby until it is determined that a transmission opportunity has been acquired.

In step S14, the transmission control unit 61 performs, for example, back-off, and when it is determined that a transmission opportunity has been acquired, the processing goes to step S15.

In step S15, the transmission control unit 61 controls the individual units so that a signal including the first data and the information regarding the timing of transmission of second data is transmitted.

Having received the signal including the first data and the information regarding the timing of transmission of second data, STA1 transmits a response signal to the signal including the first data included in the received signal (step S33 or S38 in FIG. 9 as described later). Then, STA1 generates the second data and transmits a signal including the second data at the timing of transmission of the second data (step S38 in FIG. 9 as described later).

In step S16, the reception control unit 62 is on standby until it is determined that a signal including the second data transmitted from STA1 has been received. In step S16, when it is determined that a signal including the second data has been received, the processing goes to step S17.

In step S17, the transmission control unit 61 controls the individual units so that a response signal to the second data included in the received signal is transmitted. FIG. 9 is a flowchart explaining a wireless communication process carried out by the wireless communication device 12-1 in STA1.

In step S31, the reception control unit 62 in STA1 is on standby until it is determined that a signal including the first data and the information regarding the timing of transmission of second data has been received.

In step S31, when it is determined that a signal including the first data and the information regarding the timing of transmission of second data has been received, the processing goes to step S32.

In step S32, the transmission control unit 61 determines whether or not to transmit the information regarding the timing of transmission of second data together with a response signal to the first data included in the received signal.

In step S32, if it is determined that the information regarding the timing of transmission of second data is not to be transmitted together with the response signal to the first data, the processing goes to step S33.

In step S33, the transmission control unit 61 controls the individual units so that a response signal to the first data is transmitted.

In step S32, if it is determined that the information regarding the timing of transmission of second data is to be transmitted together with the response signal to the first data, the processing goes to step S34.

In step S34, the transmission control unit 61 controls the individual units so that the information regarding the timing of transmission of second data is transmitted together with the response signal to the first data.

In step S35, the second data is generated in the upper layer on the basis of the first data. The second data that has been generated is transferred from the upper layer to the MAC layer.

In step S36, the transmission control unit 61 is on standby until it is determined that it is the timing of transmission of the second data. In step S36, when it is determined that it is the timing of transmission of the second data, the processing goes to step S37.

In step S37, the transmission control unit 61 is on standby until it is determined that a transmission opportunity has been acquired.

In step S37, the transmission control unit 61 performs, for example, back-off, and when it is determined that a transmission opportunity has been acquired, the processing goes to step S38.

In step S38, the transmission control unit 61 controls the individual units so that a signal including the second data is transmitted.

Having received the signal including the second data, AP1 transmits a response signal to the signal including the second data included in the received signal (step S17 in FIG. 8).

In step S39, the reception control unit 62 receives the response signal to the second data, the response signal being transmitted from AP1.

Figure 10:
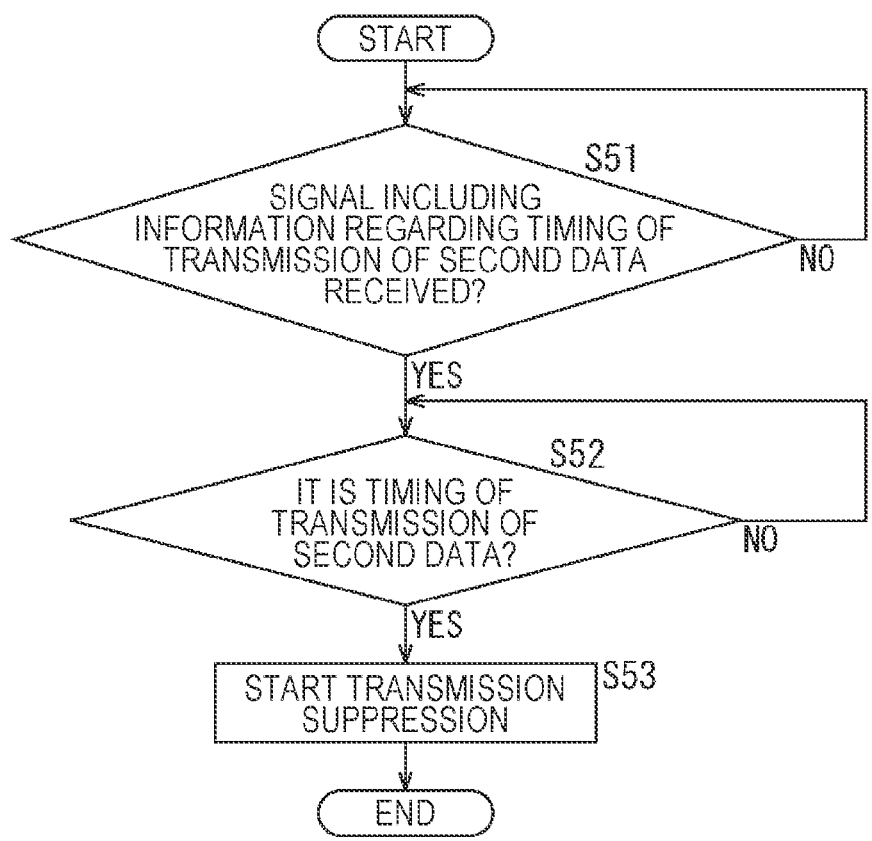
FIG. 10 is a flowchart explaining a wireless communication process carried out by the wireless communication device in AP2.

FIG. 10 is a flowchart explaining a wireless communication process carried out by the wireless communication device 11-2 in AP2.

In step S51, the reception control unit 62 in AP2 is on standby until it is determined that a signal including the information regarding the timing of transmission of second data has been received.

A signal including the first data and the information regarding the timing of transmission of second data is transmitted from AP1 (step S15 in FIG. 8). Alternatively, a signal including the information regarding the timing of transmission of second data is transmitted from STA1 together with a response signal to the first data included in the received signal (step S34 in FIG. 9). AP2 receives the signal transmitted from AP1 or the signal transmitted from STA1 depending on the distance from AP1 and the distance from STA1.

In step S51, when it is determined that a signal including the information regarding the timing of transmission of second data has been received, the processing goes to step S52.

In step S52, the transmission control unit 61 is on standby until it is determined that it is the timing of transmission of second data. In step S52, when it is determined that it is the timing of transmission of second data, the processing goes to step S53.

In step S53, the transmission control unit 61 starts transmission suppression. The transmission suppression is continued at least until STA1 receives a response signal to the second data, the response signal being transmitted by AP1.

<Example of Signal Format>

FIG. 11 is a diagram illustrating an example format of a signal including the information regarding the timing of transmission of second data, the signal being transmitted by AP1 or STA1.

The signal includes the Single Type, Length, Data Type, Priority, Estimated Transmission Start Time, and Estimated Transmission Duration fields, from left to right. The Single Type field includes information indicating that the signal includes the information regarding the timing of transmission of second data.

The Length field includes information regarding the length of the signal. The Data Type field includes information regarding the type of second data or information regarding an identifier.

The Priority field includes information regarding the priority of second data. The Estimated Transmission Start Time field includes information regarding the timing to start transmitting the second data. The information regarding the timing to start transmission may include information regarding a time period in which the transmission start occurs.

The Estimated Transmission Duration field includes information regarding the duration of transmission of second data. The information regarding the duration of transmission of second data may include information regarding the data mount of second data.

2. Second Embodiment (First Example of Constrained Topology)

<Example Configuration of Wireless Communication System>

Figure 12:
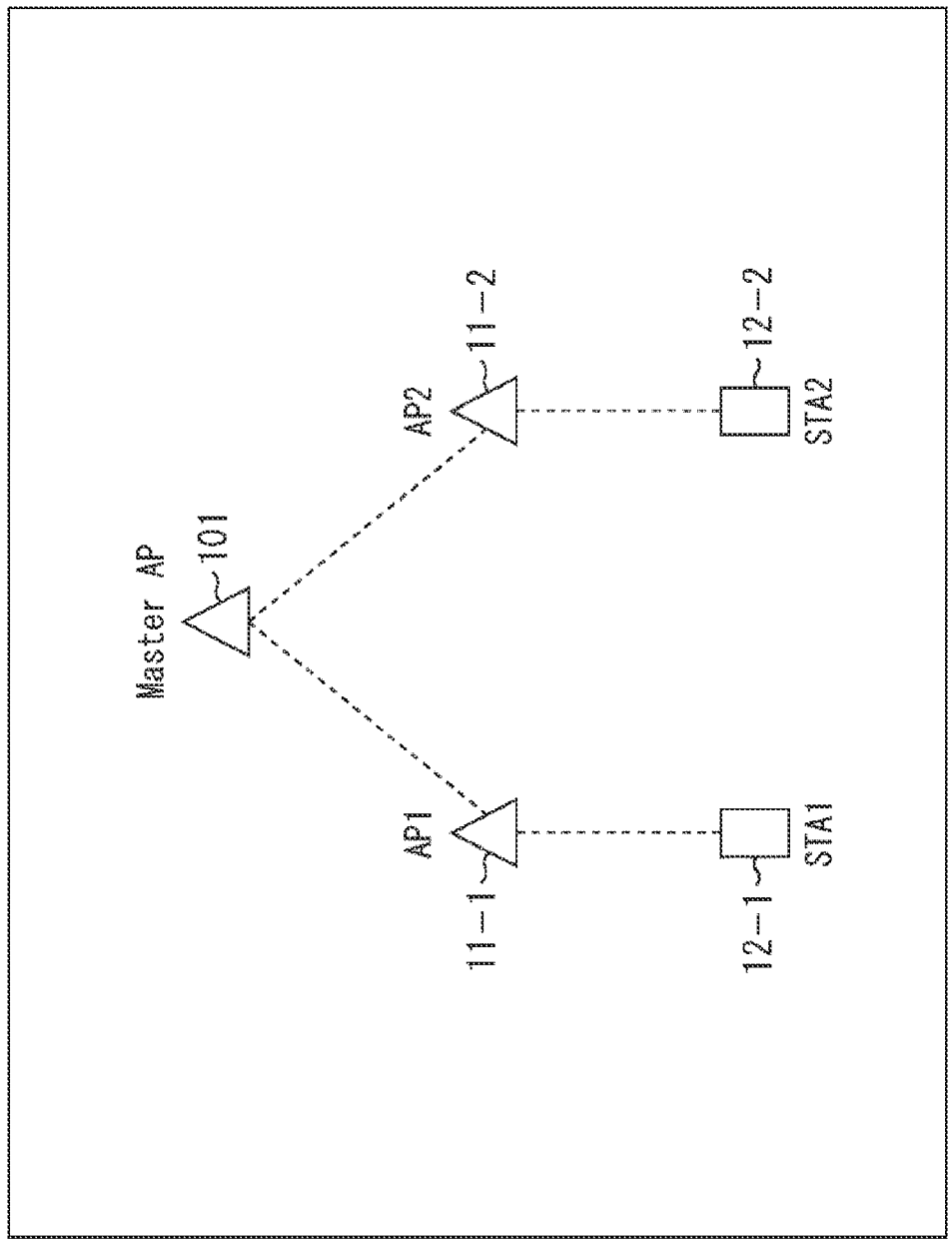
FIG. 12 is a diagram illustrating an example configuration of a wireless communication system according to a second embodiment of the present technology.

FIG. 12 is a diagram illustrating an example configuration of a wireless communication system according to a second embodiment of the present technology.

The wireless communication system in FIG. 12 is different from the wireless communication system in FIG. 5 in that Master AP, which is a master base station connecting the base station AP1 and the base station AP2, is added. The corresponding reference numerals are given to the corresponding parts, and description thereof will be omitted. The wireless communication system in FIG. 12 is a wireless communication system in a constrained topology.

Master AP includes a wireless communication device 101. The wireless communication device 101 has the same configuration as the configuration of the wireless communication device 11.

Master AP transmits a signal (first signal) that includes first data supplied from the upper layer and the information regarding the timing of transmission of second data to be generated by STA1 on the basis of a result of receiving the first data.

Master AP receives a signal including the second data transmitted by AP1, and transmits a response signal to the second data included in the received signal.

AP1 receives the signal including the first data and the information regarding the timing of transmission of second data, and transmits a response signal to the first data included in the received signal. At the same time, AP1 transmits the signal including the first data and the information regarding the timing of transmission of second data. That is, AP1 transfers the signal including the first data and the information regarding the timing of transmission of second data, the signal being transmitted from Master AP, to another device (STA1).

AP1 receives a signal including the second data transmitted from STA1, and transmits a response signal to the second data included in the received signal. AP1 transmits the signal including the second data (second signal) to Master AP. That is, AP1 transfers the signal including the second data, the signal being transmitted from STA1, to another device (Master AP).

STA1 receives the signal including the first data and the information regarding the timing of transmission of second data, the signal being transmitted from AP1, and transmits a response signal to the first data included in the received signal.

STA1 performs signal processing in its upper layer to generate the second data. STA1 transmits a signal (second signal) including the generated second data on the basis of the information regarding the timing of transmission of second data.

AP2 receives, from the signal transmitted by Master AP or AP1, a signal including the first data and the information regarding the timing of transmission of second data, and performs transmission suppression on the basis of the received information regarding the timing of transmission of second data.

As described above, in the wireless communication system in FIG. 12, a signal (first signal) that includes the first data supplied from the upper layer and the information regarding the timing of transmission of second data is transmitted by Master AP, and transferred by AP1 to STA1. Then, on the basis of the information regarding the timing of transmission of second data, a signal (second signal) including the second data is transmitted by STA1 while other transmission except the second data is suppressed by AP2.

As a result, the data supplied from the upper layer can be transmitted with low delay.

<Sequence of Operations of Wireless Communication System>

Figure 13:
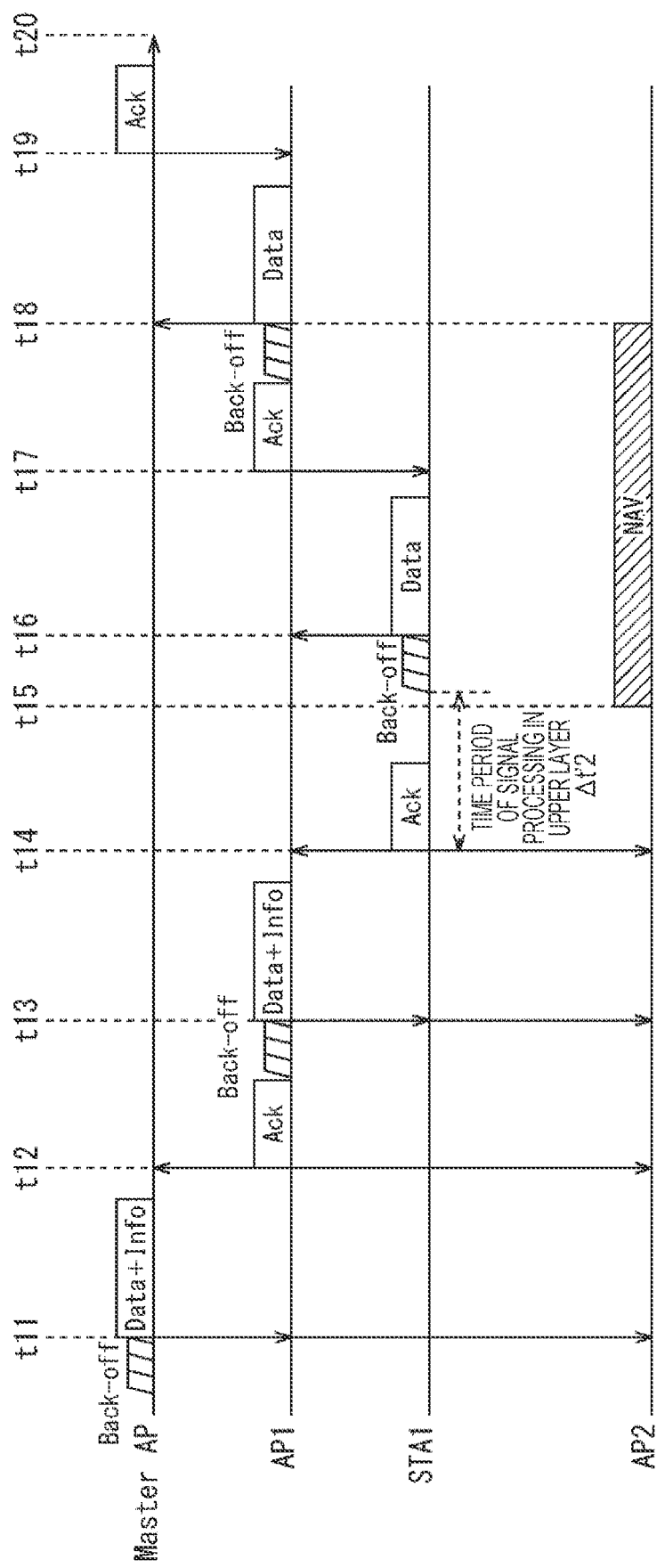
FIG. 13 is a diagram illustrating a sequence of operations of the wireless communication system of the second embodiment.

FIG. 13 is a diagram illustrating a sequence of operations of the wireless communication system of the second embodiment.

FIG. 13 illustrates an operation example in which first data and information regarding the timing of transmission of second data that is to be transmitted with low delay are generated in the upper layer in Master AP, and then transmitted by the MAC layer and the PHY layer to STA1.

Note that the description assumes that AP2 is an access point; however, operations described in the present embodiment are still valid when AP2 is replaced with a terminal.

When first data is generated in the upper layer in Master AP and the generated first data is transferred to the MAC layer, Master AP performs, for example, back-off to start acquiring a transmission opportunity.

Note here that the method used by Master AP for transferring the first data, the second data, and the information regarding the timing of transmission of second data is similar to the method used by AP1 as described above with reference to FIG. 7.

The format of the signal including the first data and the information regarding the timing of transmission of second data may be similar to the format described above with reference to FIG. 7, and may include an identifier of AP1 as the destination of the signal and an identifier of STA1 as the final destination of the signal.

Having acquired a transmission opportunity, at time t11, Master AP transmits the signal including the first data and the information regarding the timing of transmission of second data (Data+Info).

In addition, when transmitting the signal including the first data and the information regarding the timing of transmission of second data to AP1, Master AP may transmit a control signal controlling the timing at which AP1 transmits (transfers) to STA1 the signal including the first data and the information regarding the timing of transmission of second data.

The control signal, which will be described later with reference to FIG. 16, includes an identifier of the wireless communication device (AP1) to be controlled, an identifier of the wireless communication device (STA1) being the final destination of the first data, a frequency resource to be used for transmitting the signal, and a spatial stream resource. The control signal further includes information regarding a non-orthogonal multiple access resource, information regarding whether or not to perform carrier sensing when transmitting the signal, and information regarding a time interval from the control signal as information regarding the timing of transmission of the signal.

Having received from Master AP the signal including the first data and the information regarding the timing of transmission of second data, AP1 transmits, at time t12, a response signal (ACK) to the first data included in the received signal. Then, AP1 performs, for example, back-off to start acquiring a transmission opportunity.

Having acquired a transmission opportunity, at time t13, AP1 transmits (transfers) the signal including the first data and the information regarding the timing of transmission of second data (Data+Info).

Having received from AP1 the signal including the first data and the information regarding the timing of transmission of second data, STA1 transmits, at time t14, a response signal (ACK) to the first data included in the received signal. For transmitting the response signal and the information regarding the timing of transmission of second data, a method similar to the method used by STA1 as described above with reference to FIG. 7 may be used.

Having received from Master AP, AP1, or STA1 the signal including the information regarding the timing of transmission of second data, AP2 determines a duration of transmission suppression (NAV) on the basis of the information regarding timing of transmission of second data as included in the received signal. AP2 performs the transmission suppression at the beginning of the determined duration.

When AP2 receives a signal including the information regarding the timing of transmission of second data, the signal being transmitted from AP1 or STA1, AP2 determines that, for example, the time period from time t15 to time t18 is the duration of the transmission suppression (NAV). The duration of the transmission suppression (NAV) is determined so as to include at least time t16, which is the timing of transmission in STA1 of the second data, and the timing of reception in STA1 of a response signal that is transmitted at time t17 from AP1 in response to the second data.

In addition, when AP2 receives a signal including the information regarding the timing of transmission of second data, the signal being transmitted from Master AP, AP2 determines that, for example, the time period from time t15 to time t20 is the duration of the transmission suppression (NAV). The duration of the transmission suppression (NAV) is determined so as to include at least time t16, which is the timing of transmission in STA1 of the second data, and the timing of reception of a response signal transmitted from Master AP at time t19 in response to the second data.

After receiving the signal including the first data, at time t14, STA1 transmits a response signal to the first data included in the received signal and performs signal processing in the upper layer.

If STA1 holds the second data at the timing of transmission of second data, STA1 performs, for example, back-off after the time period Δt'2 of signal processing in the upper layer to start acquiring a transmission opportunity. When a transmission opportunity has been acquired, STA1 transmits a signal including the second data at, for example, time t16.

The operation of STA1 subsequent to receipt of the signal including the first data is similar to the operation of STA1 as described above with reference to FIG. 7. Furthermore, the operation in response to an inducing signal transmitted from AP1 is also similar to the operation of STA1 as described above with reference to FIG. 7.

Having received the signal including the second data transmitted from STA1, AP1 transmits, at time t17, a response signal to the second data included in the signal. The response signal to the second data, the response signal being transmitted from AP1, is received by STA1. Then, AP1 starts acquiring a transmission opportunity, and upon acquisition of a transmission opportunity, AP1 transmits (forwards) the signal including the second data to Master AP.

Having received the signal including the second data transmitted from AP1, Master AP transmits, at time t19, a response signal to the second data included in the received signal.

Note that the wireless communication devices in AP1 and AP2 in FIG. 13 are also access points, and thus other wireless communication devices thereunder may be controlled so that these other wireless communication devices perform transmission suppression. Likewise, Master AP may also control other wireless communication devices thereunder so that these other wireless communication devices perform transmission suppression.

Furthermore, prior to the sequence in FIG. 13, Master AP, AP1, and STA1 may mutually confirm whether or not they support the above-described operations. In addition, Master AP, AP1, and STA1 may exchange information indicating the processing capacity in their upper layers.

<Example Operations of Wireless Communication Device>

Figure 14:
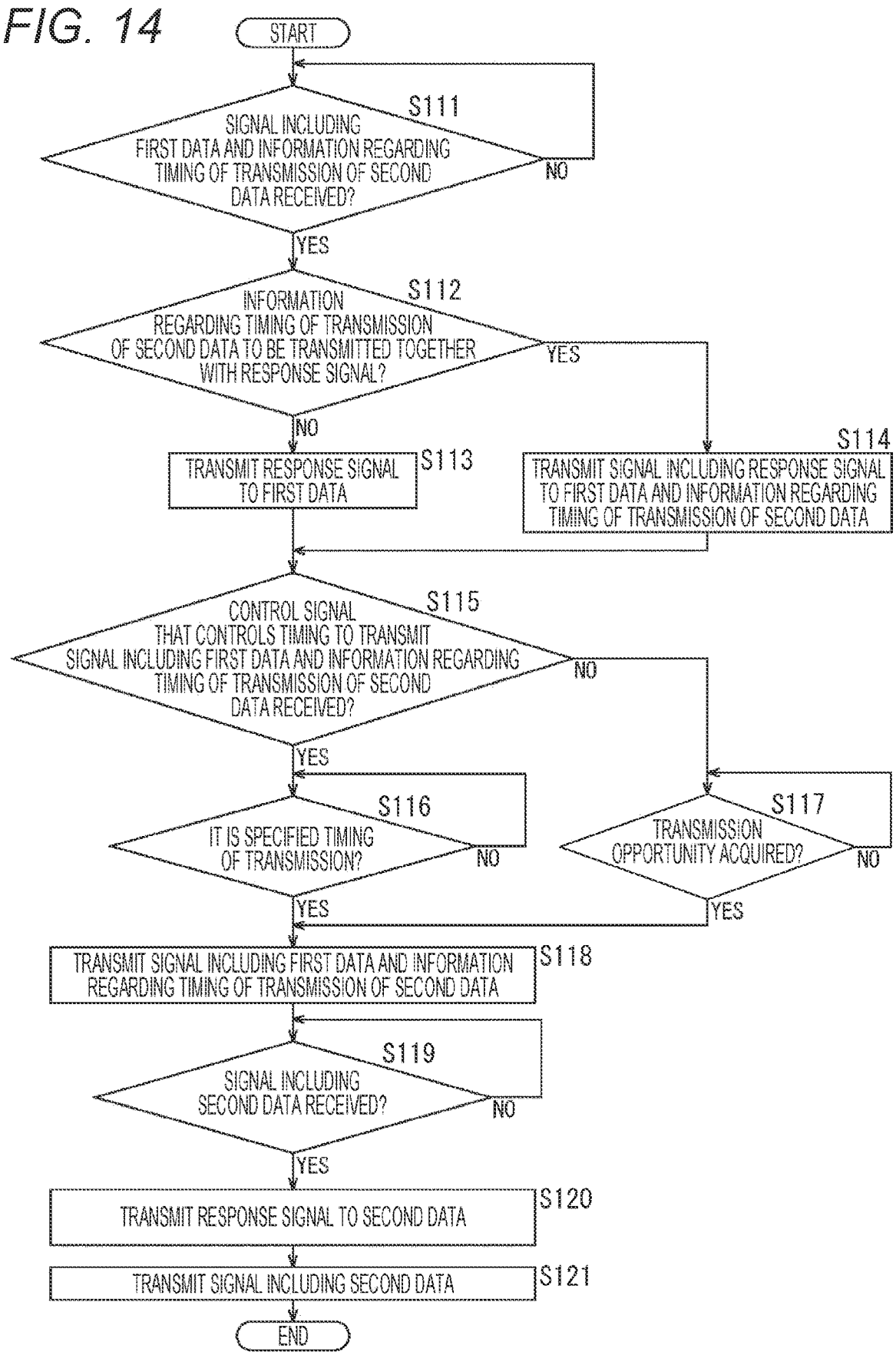
FIG. 14 is a flowchart explaining a wireless communication process carried out by the wireless communication device in AP1.

FIG. 14 is a flowchart explaining a wireless communication process carried out by the wireless communication device 11-1 in AP1.

A signal including the first data and the information regarding the timing of transmission of second data is transmitted from Master AP (step S136 or S137 in FIG. 15 as described later).

In step S111, the reception control unit 62 in AP1 is on standby until it is determined that a signal including the first data and the information regarding the timing of transmission of second data has been received. In step S111, when it is determined that a signal including the first data and the information regarding the timing of transmission of second data has been received, the processing goes to step S112.

In step S112, the transmission control unit 61 determines whether or not to transmit the information regarding the timing of transmission of second data together with a response signal to the first data included in the received signal. In step S112, if it is determined that the information regarding the timing of transmission of second data is not to be transmitted together with the response signal to the first data, the processing goes to step S113.

In step S113, the transmission control unit 61 controls the individual units so that a response signal to the first data is transmitted.

In step S112, if it is determined that the information regarding the timing of transmission of second data is to be transmitted together with the response signal to the first data, the processing goes to step S114.

In step S114, the transmission control unit 61 controls the individual units so that a signal including the response signal to the first data and the information regarding the timing of transmission of second data is transmitted.

In step S115, the reception control unit 62 determines whether or not a control signal controlling the timing of transmission of a signal including the first data and the information regarding the timing of transmission of second data has been received.

A signal that includes the first data and the information regarding the timing of transmission of second data and a control signal that controls the timing of transmission of the signal are transmitted from Master AP (step S136 in FIG. 15 as described later).

In step S115, if it is determined that a control signal controlling the timing of transmission of a signal including the first data and the information regarding the timing of transmission of second data has been received, the processing goes to step S116.

In step S116, the transmission control unit 61 is on standby until it is determined that it is the timing of transmission specified in the control signal that is determined to have been received.

In step S116, when it is determined that it is the timing of transmission specified in the control signal that is determined to have been received, the processing goes to step S118.

On the other hand, in step S115, if it is determined that a control signal controlling the timing of transmission of a signal including the first data and the information regarding the timing of transmission of second data has not been received, the processing goes to step S117.

In step S117, the transmission control unit 61 is on standby until it is determined that a transmission opportunity has been acquired.

In step S117, for example, back-off is performed, and when it is determined that a transmission opportunity has been acquired, the processing goes to step S118.

In step S118, the transmission control unit 61 controls the individual units so that a signal including the first data and the information regarding the timing of transmission of second data is transmitted.

In step S119, the reception control unit 62 is on standby until it is determined that a signal including the second data has been received.

Figure 9:
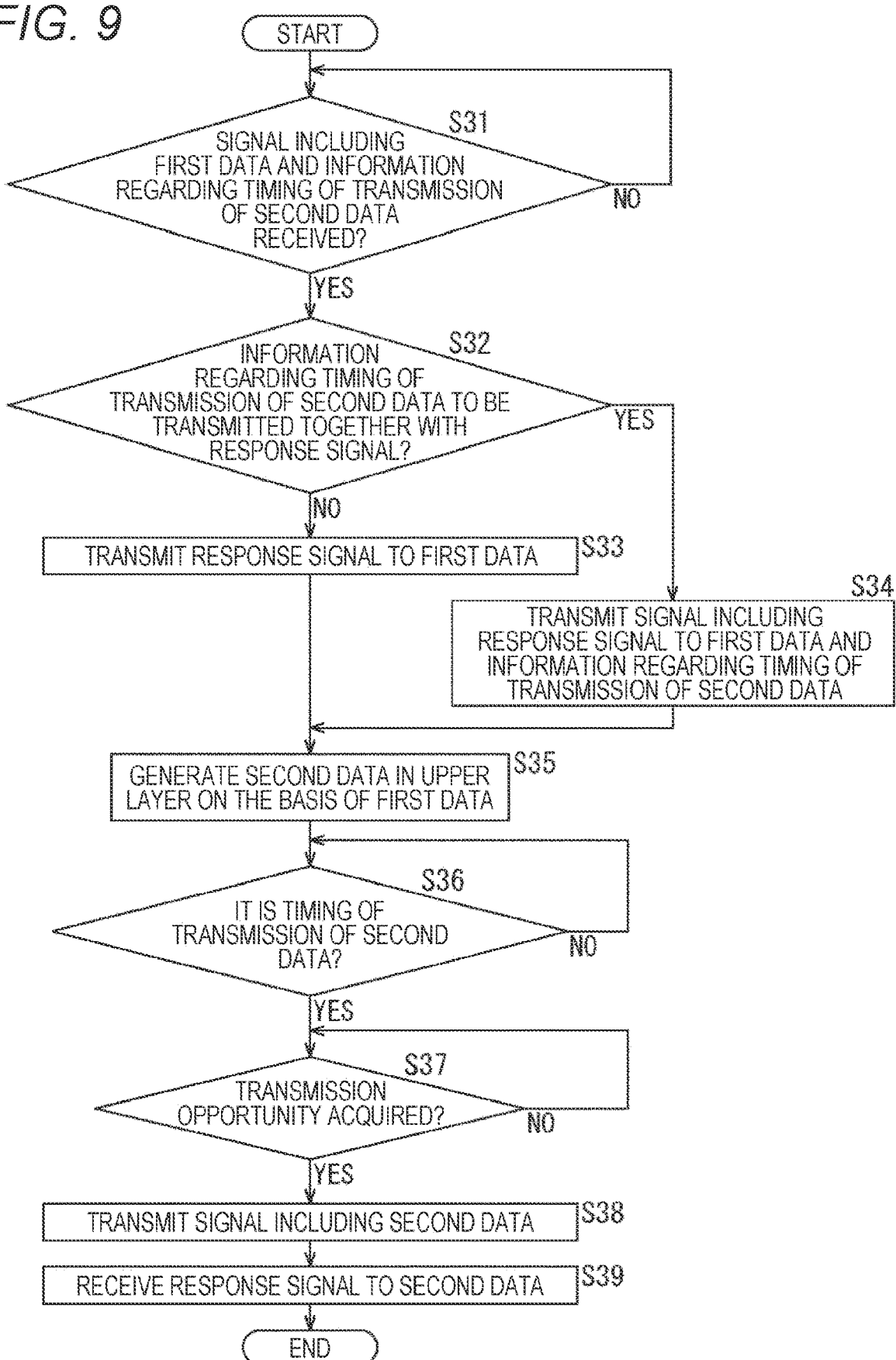
FIG. 9 is a flowchart explaining a wireless communication process carried out by the wireless communication device in STA1.

A signal including the second data is transmitted from STA1 (step S39 in FIG. 9).

In step S119, when it is determined that a signal including the second data has been received, the processing goes to step S120.

In step S120, the transmission control unit 61 controls the individual units so that a response signal to the second data included in the received signal is transmitted.

In step S121, the transmission control unit 61 controls the individual units so that for example, back-off is performed to acquire a transmission opportunity, and then a signal including the second data is transmitted to Master AP. After that, the wireless communication process carried out by the wireless communication device 11-1 in AP1 is ended.

Figure 15:
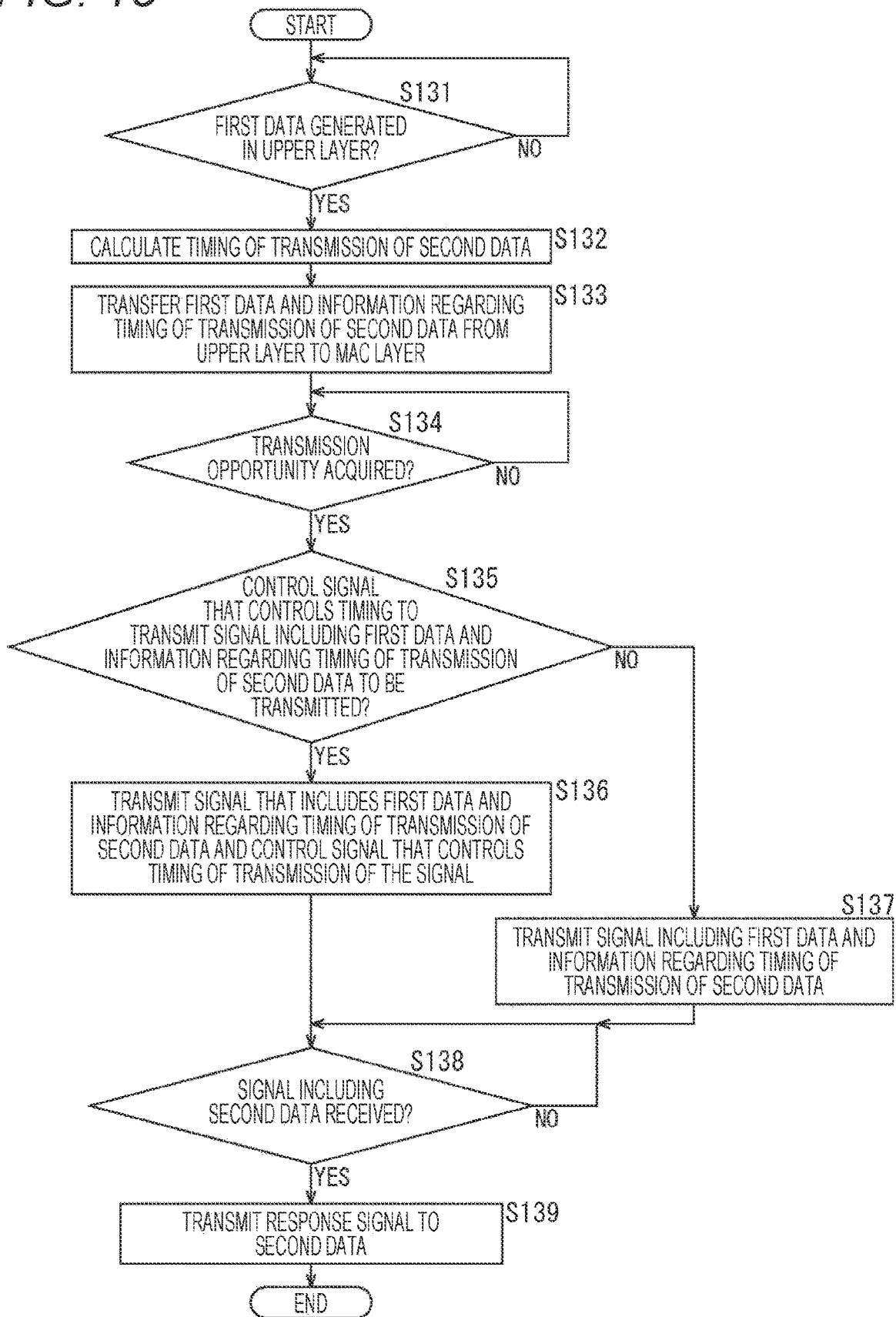
FIG. 15 is a flowchart explaining a wireless communication process carried out by the wireless communication device in Master AP.

FIG. 15 is a flowchart explaining a wireless communication process carried out by the wireless communication device 101 in Master AP.

In step S131, the data processing unit 51 in Master AP is on standby until it is determined that first data has been generated in the upper layer. In step S131, when it is determined that first data has been generated in the upper layer, the processing goes to step S132.

In step S132, the timing of transmission of second data is calculated in the upper layer.

In step S133, the interface connecting the upper layer and the MAC layer transfers, from the upper layer to the MAC layer, the first data and the information regarding the timing of transmission of second data.

In step S134, the transmission control unit 61 is on standby until it is determined that a transmission opportunity has been acquired.

In step S134, the transmission control unit 61 performs, for example, back-off, and when it is determined that a transmission opportunity has been acquired, the processing goes to step S135.

In step S135, the transmission control unit 61 determines whether or not to transmit a control signal controlling the timing of transmission of a signal including the first data and the information regarding the timing of transmission of second data.

In step S135, if it is determined that a control signal controlling the timing of transmission of a signal including the first data and the information regarding the timing of transmission of second data is to be transmitted, the processing goes to step S136.

In step S136, the transmission control unit 61 controls the individual units so that a signal that includes the first data and the information regarding the timing of transmission of second data and a control signal that controls the timing of transmission of the signal are transmitted.

In step S135, if it is determined that a control signal controlling the timing of transmission of a signal including the first data and the information regarding the timing of transmission of second data is not to be transmitted, the processing goes to step S137.

In step S137, the transmission control unit 61 controls the individual units so that a signal including the first data and the information regarding the timing of transmission of second data is transmitted.

Having received the signal, STA1 transmits a signal including the second data at the timing of transmission of the second data (step S39 in FIG. 9). Having received the signal including the second data transmitted by STA1, AP1 transmits a response signal to the signal including the second data included in the received signal, and then after acquiring a transmission opportunity, transmits the signal including the second data (step S121 in FIG. 14).

In step S138, the reception control unit 62 is on standby until it is determined that a signal including the second data transmitted from AP1 has been received. In step S138, when it is determined that a signal including the second data has been received, the processing goes to step S139.

In step S139, the transmission control unit 61 controls the individual units so that a response signal to the second data included in the received signal is transmitted.

Note that the wireless communication process carried out by the wireless communication device 12-1 in STA1 in the wireless communication system in FIG. 13 is basically similar to the wireless communication process carried out by the wireless communication device 12-1 in STA1 in the wireless communication system in FIG. 5 as described above with reference to FIG. 9, and thus the description thereof is omitted.

The wireless communication process carried out by the wireless communication device 11-2 in AP2 in the wireless communication system in FIG. 13 is basically similar to the wireless communication process carried out by the wireless communication device 11-1 in AP2 in the wireless communication system in FIG. 5 as described above with reference to FIG. 10, and thus the description thereof is omitted.

<Example of Control Signal Format>

FIG. 16 is a diagram illustrating an example format of a control signal controlling the timing of transmission of a signal that includes first data and information regarding the timing of transmission of second data, the signal being transmitted by Master AP to AP1 and destined for STA1.

The control signal includes the Single Type, Length, Target ID, Destination ID, Frequency Resource, Spatial Stream Resource, NOMA Resource, Carrier Sense Required Timing, and Timing fields, from left to right.

The Single Type field includes information indicating that the signal includes the information regarding the timing of transmission of second data.

The Length field includes information regarding the length of the signal.

The Target ID field includes information regarding an identifier of the wireless communication device to be controlled.

The Destination ID field includes information regarding an identifier of the wireless communication device being the final destination of the data.

The Frequency Resource field includes information regarding a frequency resource.

The Spatial Stream Resource field includes information regarding a spatial stream resource.

The NOMA Resource field includes information regarding a non-orthogonal multiple access resource.

The Carrier Sense Required Timing field includes information regarding whether or not to perform carrier sensing during transmission.

The Timing field includes, as the information regarding the timing of transmission, information regarding a time interval from the control signal controlling the timing.

3. Third Embodiment (Second Example of Constrained Topology)

<Sequence of Operations of Wireless Communication System>

Figure 17:
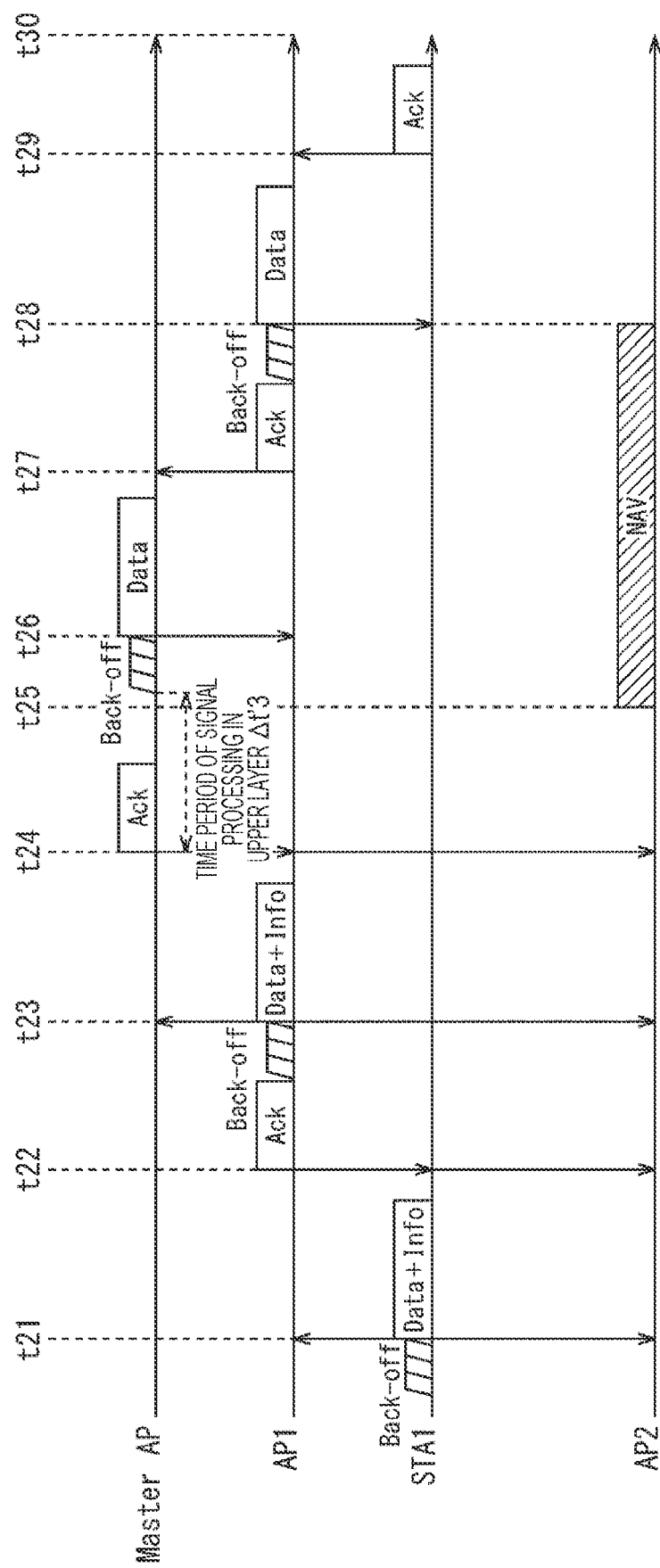
FIG. 17 is a diagram illustrating a sequence of operations of a wireless communication system according to a third embodiment of the present technology.

FIG. 17 is a diagram illustrating a sequence of operations of a wireless communication system according to a third embodiment of the present technology.

The wireless communication system according to the third embodiment of the present technology has a configuration basically similar to the configuration of the wireless communication system in FIG. 12, and thus description of FIG. 17 will be given by using the wireless communication system in FIG. 12.

FIG. 17 illustrates an operation example in which first data and information regarding the timing of transmission of second data that is to be transmitted with low delay are generated in the upper layer in STA1, and then transmitted by the MAC layer and the PHY layer to Master AP.

When first data is generated in the upper layer in STA1 and the generated first data is transferred to the MAC layer, STA1 performs, for example, back-off to start acquiring a transmission opportunity.

Note here that the method used by STA1 for transferring the first data, the second data, and the information regarding the timing of transmission of second data is similar to the method used by AP1 as described above with reference to FIG. 7.

The format of the signal including the first data and the information regarding the timing of transmission of second data may be similar to the format described above with reference to FIG. 7, and may include an identifier of AP1 as the destination of the signal and an identifier of Master AP as the final destination of the signal.

Having acquired a transmission opportunity, at time t21, STA1 transmits a signal including the first data and the information regarding the timing of transmission of second data (Data+Info).

In addition, when transmitting the signal including the first data and the information regarding the timing of transmission of second data to AP1, STA1 may transmit a control signal controlling the timing at which AP1 transmits (transfers) to Master AP the signal including the first data and the information regarding the timing of transmission of second data.¥

The control signal and the method for transmitting the control signal are similar to the control signal and the method for transmitting the control signal for Master AP as described above with reference to FIG. 13.

Having received from STA1 the signal including the first data and the information regarding the timing of transmission of second data, AP1 transmits, at time t22, a response signal (ACK) to the first data included in the received signal. Then, AP1 performs, for example, back-off to start acquiring a transmission opportunity.

Having acquired a transmission opportunity, at time t23, AP1 transmits (transfers) the signal including the first data and the information regarding the timing of transmission of second data (Data+Info).

Having received from AP1 the signal including the first data and the information regarding the timing of transmission of second data, Master AP transmits, at time t24, a response signal (ACK) to the first data included in the received signal. For transmitting the response signal and the information regarding the timing of transmission of second data, a method similar to the method used by STA1 as described above with reference to FIG. 13 may be used.

Having received from Master AP, AP1, or STA1 the signal including the information regarding the timing of transmission of second data, AP2 determines a duration of transmission suppression (NAV) on the basis of the information regarding timing of transmission of second data as included in the received signal. AP2 performs the transmission suppression at the beginning of the determined duration.

When AP2 receives a signal including the information regarding the timing of transmission of second data, the signal being transmitted from AP1 at time t23 or transmitted from Master AP at time t24, AP2 determines that, for example, the time period from time t25 to time t28 is the duration of the transmission suppression (NAV). The duration of the transmission suppression (NAV) is determined so as to include at least time t26, which is the timing of transmission in Master AP of the second data, and the timing of reception in Master AP of a response signal transmitted from AP2 at time t27 in response to the second data.

In addition, when AP2 receives a signal including the information regarding the timing of transmission of second data, the signal being transmitted from STA1 at time t21, AP2 determines that, for example, the time period from time t25 to time t30 is the duration of the transmission suppression (NAV). The duration of the transmission suppression (NAV) is determined so as to include at least time t26, which is the timing of transmission in Master AP of the second data, and the timing of reception in Master AP of a response signal transmitted from STA1 at time t29 in response to the second data.

After receiving the signal including the second data, at time t24, Master AP transmits a response signal to the second data included in the received signal and performs signal processing in the upper layer.

If Master AP holds the second data at the timing of transmission of the second data, Master AP performs, for example, back-off after the time period Δt'3 of signal processing in the upper layer to start acquiring a transmission opportunity. When a transmission opportunity has been acquired, Master AP transmits a signal including the second data at, for example, time t26.

The operation of Master AP subsequent to receipt of the signal including the first data is similar to the operation of STA1 as described above with reference to FIG. 7. Furthermore, the operation in response to an inducing signal transmitted from AP1 is also similar to the operation of STA1 as described above with reference to FIG. 7.

Having received the signal including the second data transmitted from Master AP, AP1 transmits, at time t27, a response signal to the second data. The response signal to the second data, the response signal being transmitted from AP1, is received by Master AP. Then, AP1 starts acquiring a transmission opportunity, and upon acquisition of a transmission opportunity, AP1 transmits (forwards) the signal including the second data to STA1.

Having received the signal including the second data transmitted from AP1, STA1 transmits, at time t29, a response signal to the second data included in the received signal.

Note that the wireless communication devices in AP1 and AP2 in FIG. 17 are also access points, and thus other wireless communication devices thereunder may be controlled so that these other wireless communication devices perform transmission suppression. Likewise, Master AP may also control other wireless communication devices thereunder so that these other wireless communication devices perform transmission suppression.

Furthermore, prior to the sequence in FIG. 17, Master AP, AP1, and STA1 may mutually confirm whether or not they support the above-described operations. In addition, Master AP, AP1, and STA1 may exchange information indicating the processing capacity in their upper layers.

Note that the format of a signal including information of the timing of transmission of second data, the signal being transmitted by AP1, STA1, or Master AP1 in FIG. 17, is similar to the format of a signal illustrated in FIG. 11.

Note that the format of a control signal controlling the timing of transmission of a signal including the first data and the information regarding the timing of transmission of second data, the signal being transmitted by STA1 to AP1 and destined for Master AP1 as shown in FIG. 17, is similar to the format of a control signal illustrated in FIG. 16.

As described above, in the present technology, a signal is transmitted, the signal including first data supplied from the upper layer and the information regarding the timing of transmission of second data that is generated by another wireless communication device on the basis of a result of receiving the first data and is transmitted therefrom.

That is, regarding the data to be transmitted with low delay in an upper layer, a layer lower than the upper layer is enabled to identify the data as the data to be transmitted with low delay, and interference by surroundings is suppressed. As a result, the data to be transmitted in an upper layer with low delay can be transmitted with low delay.

4. Fourth Embodiment (Computer)

<Example Configuration of Computer>

The aforementioned series of process steps can be executed by hardware or executed by software. In a case where the series of process steps is to be executed by software, programs included in the software are installed from a program recording medium onto a computer incorporated into special-purpose hardware, a general-purpose computer, or the like.

FIG. 18 is a block diagram illustrating an example hardware configuration of a computer in which the aforementioned series of process steps is executed by programs.

A central processing unit (CPU) 301, a read only memory (ROM) 302, and a random access memory (RAM) 303 are connected to one another by a bus 304.

Moreover, an input/output interface 305 is connected to the bus 304. To the input/output interface 305, an input unit 306 including a keyboard, a mouse, or the like and an output unit 307 including a display, a speaker, or the like are connected. Furthermore, to the input/output interface 305, a storage unit 308 including a hard disc, a non-volatile memory, or the like, a communication unit 309 including a network interface or the like, and a drive 310 that drives a removable medium 311 are connected.

In the computer configured as above, the CPU 301 performs the aforementioned series of process steps by, for example, loading a program stored in the storage unit 308 into the RAM 303 via the input/output interface 305 and the bus 304 and executing the program.

Programs to be executed by the CPU 301 are recorded on, for example, the removable medium 311 or provided via a wired or wireless transmission medium such as a local area network, the Internet, or digital broadcasting, and installed on the storage unit 308.

Note that the programs executed by the computer may be programs for process steps to be performed in time series in the order described herein, or may be programs for process steps to be performed in parallel or on an as-needed basis when, for example, a call is made.

Furthermore, a system herein means a set of a plurality of components (apparatuses, modules (parts), and the like) regardless of whether or not all the components are within the same housing. Therefore, either of a plurality of apparatuses contained in separate housings and connected via a network and one apparatus in which a plurality of modules is contained in one housing is a system.

Note that the effects described herein are examples only and are not restrictive, and other effects may be provided.

Embodiments of the present technology are not limited to the above-described embodiments, and various modifications can be made thereto without departing from the gist of the present technology.

For example, the present technology can be in a cloud computing configuration in which one function is distributed among, and handled in collaboration by, a plurality of devices via a network.

Furthermore, each of the steps described above with reference to the flowcharts can be executed not only by one device but also by a plurality of devices in a shared manner.

Moreover, in a case where one step includes a plurality of processes, the plurality of processes included in the one step can be executed not only by one device but also by a plurality of devices in a shared manner.

<Examples of Configuration Combination>

The present technology may have the following configurations.

(1) A wireless communication device including:
a transmission control unit that causes a signal to be transmitted, the signal including first data that is supplied from an upper layer and information regarding timing of transmission of second data that is generated in another wireless communication device on the basis of a result of receiving the first data and is transmitted from the another wireless communication device.

(2) The wireless communication device according to (1), in which the information regarding the timing of transmission is information based on timing at which the second data is generated in an upper layer in the another wireless communication device.

(3) The wireless communication device according to (1) or (2), in which the information regarding the timing of transmission is transferred from the upper layer to a MAC layer being a lower layer.

(4) The wireless communication device according to any of (1) to (3), further including:
an interface through which the information regarding the timing of transmission is transferred from the upper layer.

(5) The wireless communication device according to any of (1) to (4), in which
the transmission control unit causes a control signal to be transmitted, the control signal being for the another wireless communication device that has received the signal to control transfer of the signal.

(6) The wireless communication device according to (5), in which the control signal controls timing of transfer of the signal.

(7) The wireless communication device according to any of (1) to (6), further including:
a reception unit that receives the signal transmitted from another wireless communication device, in which
the transmission control unit suppresses transmission of another signal on the basis of information of the timing of transmission.

(8) The wireless communication device according to (7), in which the transmission control unit suppresses transmission of the another signal, the transmission being performed by a wireless communication device under the transmission control unit, on the basis of the information regarding the timing of transmission.

(9) A wireless communication method including:
transmitting a signal including first data that is supplied from an upper layer and information regarding timing of transmission of second data that is generated on the basis of a result of receiving the first data, the transmitting being performed by a wireless communication device.

(10) A wireless communication device including:
a reception unit that receives a first signal including first data that is supplied from an upper layer and information regarding timing of transmission of second data that is generated in the wireless communication device on the basis of a result of receiving the first data and is transmitted from the wireless communication device.

(11) The wireless communication device according to (10), further including: a transmission control unit that causes a second signal to be transmitted, the second signal including the second data, on the basis of the information regarding the timing of transmission.

(12) The wireless communication device according to (11), in which the transmission control unit causes a response signal to the first data to be transmitted with information regarding the timing of transmission added to the response signal.

(13) The wireless communication device according to (11) or (12), in which the transmission control unit causes the first signal to be transferred.

(14) The wireless communication device according to (13), in which the reception unit receives a control signal that controls transfer of the first signal, and the transmission control unit causes the first signal to be transferred on the basis of the control signal.

(15) A wireless communication method including:
receiving a first signal including first data that is supplied from an upper layer and information regarding timing of transmission of second data that is generated in the wireless communication device on the basis of a result of receiving the first data and is transmitted from the wireless communication device, the receiving being performed by the wireless communication device.

REFERENCE SIGNS LIST

11, 11-1, 11-2 Wireless communication device
12, 12-1, 12-2 Wireless communication device
31 Control unit
32 Power supply unit
33 Communication unit
34, 34-1 to 34-N Antenna
51 Data processing unit
52 Wireless control unit
53 Modulation/demodulation unit
54 Signal processing unit
55 Channel estimation unit
56, 56-1 to 56-N Wireless I/F unit
57, 57-1 to 57-N Amplification unit
61 Transmission control unit
62 Reception control unit
101 Wireless communication device

The invention claimed is:

1. A wireless communication device comprising:
a transmission control unit that causes a signal to be transmitted, the signal including first data that is supplied from an upper layer in the wireless communication device, and information regarding timing of transmission of second data that is generated in another wireless communication device on a basis of a result of receiving the first data and is transmitted from the another wireless communication device.

2. The wireless communication device according to claim 1, wherein
the information regarding the timing of transmission is information based on timing at which the second data is generated in an upper layer in the another wireless communication device.

3. The wireless communication device according to claim 1, wherein
the information regarding the timing of transmission is transferred from the upper layer to a MAC layer being a lower layer.

4. The wireless communication device according to claim 1, further comprising:
an interface through which the information regarding the timing of transmission is transferred from the upper layer.

5. The wireless communication device according to claim 1, wherein
the transmission control unit causes a control signal to be transmitted, the control signal being for the another wireless communication device that has received the signal to control transfer of the signal.

6. The wireless communication device according to claim 5, wherein
the control signal controls timing of transfer of the signal.

7. The wireless communication device according to claim 1, further comprising:
a reception unit that receives the signal transmitted from another wireless communication device, wherein
the transmission control unit suppresses transmission of another signal on a basis of information regarding the timing of transmission.

8. The wireless communication device according to claim 7, wherein
the transmission control unit suppresses transmission of the another signal, the transmission being performed by the wireless communication device under the transmission control unit, on a basis of the information regarding the timing of transmission.

9. A wireless communication method, comprising:
transmitting a signal including first data that is supplied from an upper layer in a wireless communication device, and information regarding timing of transmission of second data that is generated on a basis of a result of receiving the first data.

10. A wireless communication device, comprising:
a reception unit that receives a first signal including first data that is supplied from an upper layer in the wireless communication device, and information regarding timing of transmission of second data that is generated in the wireless communication device on a basis of a result of receiving the first data and transmitted from the wireless communication device.

11. The wireless communication device according to claim 10, further comprising:
a transmission control unit that causes a second signal to be transmitted, the second signal including the second data, on a basis of the information regarding the timing of transmission.

12. The wireless communication device according to claim 11, wherein
the transmission control unit causes a response signal to the first data to be transmitted with information regarding the timing of transmission added to the response signal.

13. The wireless communication device according to claim 11, wherein
the transmission control unit causes the first signal to be transferred.

14. The wireless communication device according to claim 13, wherein
the reception unit receives a control signal that controls transfer of the first signal, and
the transmission control unit causes the first signal to be transferred on a basis of the control signal.

15. A wireless communication method, comprising:
receiving a first signal including first data that is supplied from an upper layer in a wireless communication device, and information regarding timing of transmission of second data that is generated in the wireless communication device on a basis of a result of receiving the first data and transmitted from the wireless communication device.

\* \* \* \* \*